(12) United States Patent
Tsuruta et al.

(10) Patent No.: US 12,066,089 B1
(45) Date of Patent: Aug. 20, 2024

(54) FOLLOWER BEARING MODULE

(71) Applicant: NIPPON THOMPSON CO., LTD., Tokyo (JP)

(72) Inventors: Kenichiro Tsuruta, Mino (JP); Tomoaki Nakamura, Mino (JP); Yusuke Takaya, Mino (JP); Yuichi Shibuya, Mino (JP); Jinya Suzuki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 18/580,233

(22) PCT Filed: May 23, 2023

(86) PCT No.: PCT/JP2023/019181
§ 371 (c)(1),
(2) Date: Jan. 18, 2024

(87) PCT Pub. No.: WO2023/243331
PCT Pub. Date: Dec. 21, 2023

(30) Foreign Application Priority Data

Jun. 17, 2022 (JP) .................................. 2022-097876

(51) Int. Cl.
*F16C 13/00* (2006.01)
*F16C 19/26* (2006.01)
*F16H 53/06* (2006.01)

(52) U.S. Cl.
CPC ........... *F16H 53/06* (2013.01); *F16C 13/006* (2013.01); *F16C 19/26* (2013.01); *F16C 2226/60* (2013.01)

(58) Field of Classification Search
CPC ........ F16C 13/006; F16C 13/02; F16C 19/26; F16C 21/00; F16C 2226/60; F16H 53/06; B23Q 5/342
See application file for complete search history.

(56) References Cited

U.S. PATENT DOCUMENTS

| 4,113,327 | A | * | 9/1978 | Koch | ...................... F16C 13/006 384/485 |
| 4,798,149 | A | * | 1/1989 | Hoffmann | .............. B65G 39/09 16/98 |
| 5,724,861 | A | | 3/1998 | Mang | |

FOREIGN PATENT DOCUMENTS

| DE | 102018220323 B3 | * | 11/2019 | .............. F16C 13/00 |
| EP | 0394186 A1 | * | 10/1980 | |

(Continued)

OTHER PUBLICATIONS

Aug. 8, 2023 International Search Report issued in International Patent Application No. PCT/JP2023/019181.

*Primary Examiner* — Phillip A Johnson
(74) *Attorney, Agent, or Firm* — Oliff PLC

(57) ABSTRACT

A follower bearing module includes a follower bearing, a fixing element, and a fastening element. The follower bearing includes an inner member, an outer ring having an annular second raceway surface that faces a first raceway surface, and a plurality of rolling elements. The inner member includes a large diameter portion having the first raceway surface, and a shaft portion extending from the large diameter portion and having at least a portion accommodated in a mounting hole. The fixing element includes a cylindrical portion disposed in a shaft through hole and having a threaded groove on its inner circumferential surface, and a plate-shaped portion provided at one end of the cylindrical portion. The fastening element fastens the follower bearing and the fixing element with the cylindrical (Continued)

portion being disposed in the shaft through hole. At least one of the follower bearing and the fixing element includes a rotation prevention mechanism.

12 Claims, 13 Drawing Sheets

(56) References Cited

FOREIGN PATENT DOCUMENTS

| | | |
|---|---|---|
| JP | H10-2400 A | 1/1998 |
| JP | 2000-346173 A | 12/2000 |
| JP | 2020-125808 A | 8/2020 |

* cited by examiner

FOLLOWER BEARING MODULE

TECHNICAL FIELD

The present disclosure relates to a follower bearing module. The present application claims priority based on Japanese Patent Application No. 2022-97876 filed on Jun. 17, 2022, the entire contents of which are incorporated herein by reference.

BACKGROUND ART

A cam follower mounting structure utilized in mounting a cam follower is known (see, e.g., Patent Literature 1). A cam follower fixing structure utilized in fixing a cam follower is also known (see, e.g., Patent Literature 2).

CITATION LIST

Patent Literature

Patent Literature 1: Japanese Patent Application Laid-Open No. H10-2400
Patent Literature 2: Japanese Patent Application Laid-Open No. 2000-346173

SUMMARY OF INVENTION

Technical Problem

A follower bearing is mounted and fixed to a mounted member to allow the outer ring to rotate. Here, in mounting of the follower bearing, the installation space at the mounting location is preferably as small as possible. In other words, reduction in size of the installation space for the follower bearing is required. Of course, convenience during mounting, such as easiness in mounting of the follower bearing, is also required.

Thus, one of the objects is to provide a follower bearing module that makes it possible to reduce the size of the installation space and improve the convenience during mounting of the follower bearing.

Solution to Problem

The follower bearing module according to the present disclosure is a follower bearing module for mounting a follower bearing to a mounted member having a mounting hole. The follower bearing module includes: a follower bearing, a fixing element operative to fix the follower bearing to the mounted member; and a fastening element operative to fasten the follower bearing and the fixing element, the fastening element including a body having threads on an outer circumferential surface thereof. The follower bearing includes an inner member having a shaft through hole penetrating in an axial direction, the inner member having an annular first raceway surface on an outer circumferential surface thereof, an outer ring having an annular second raceway surface facing the first raceway surface on an inner circumferential surface thereof, and a plurality of rolling elements arranged on an annular raceway along the first and second raceway surfaces so as to contact the first and second raceway surfaces. The inner member includes a large diameter portion having the first raceway surface provided thereon, and a shaft portion extending in the axial direction from the large diameter portion and having at least a portion accommodated in the mounting hole. The fixing element includes a cylindrical portion disposed in the shaft through hole and having a threaded groove on an inner circumferential surface thereof, and a plate-shaped portion provided at one end in the axial direction of the cylindrical portion and extending radially outward. The fastening element fastens the follower bearing and the fixing element with the cylindrical portion being disposed in the shaft through hole. At least one of the follower bearing and the fixing element includes a rotation prevention mechanism operative to prevent rotation of the fixing element.

Advantageous Effects of Invention

The follower bearing module described above makes it possible to reduce the size of the installation space and improve the convenience during mounting of the follower bearing.

DESCRIPTION OF EMBODIMENTS

Outline of Embodiments

Figure 1:
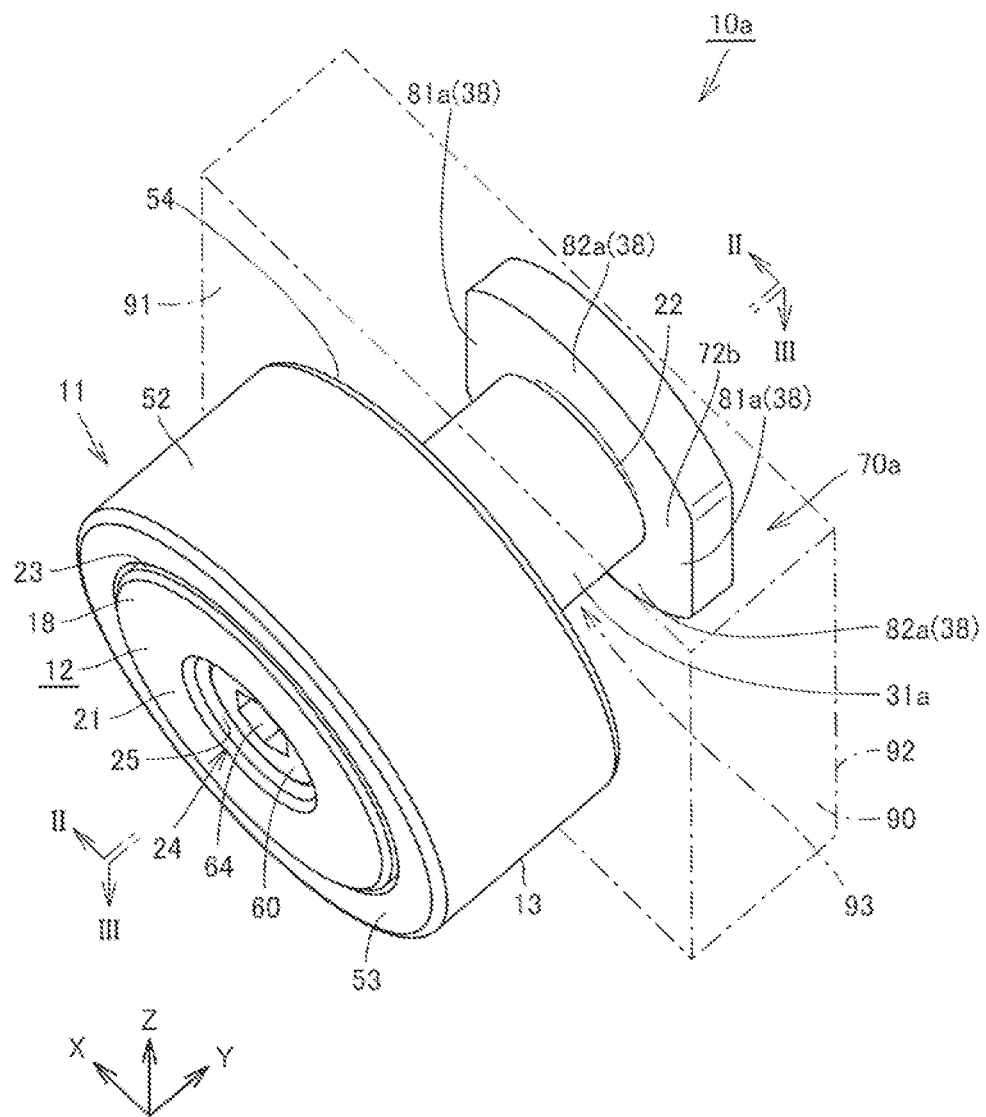
FIG. 1 is a schematic perspective view of a follower bearing module in Embodiment 1 of the present disclosure.

The follower bearing module of the present disclosure is a follower bearing module for mounting a follower bearing to a mounted member having a mounting hole. The follower bearing module includes: a follower bearing; a fixing element operative to fix the follower bearing to the mounted member; and a fastening element operative to fasten the follower bearing and the fixing element, the fastening element including a body having threads on an outer circumferential surface thereof. The follower bearing includes an inner member having a shaft through hole penetrating in an axial direction, the inner member having an annular first raceway surface on an outer circumferential surface thereof, an outer ring having an annular second raceway surface facing the first raceway surface on an inner circumferential surface thereof, and a plurality of rolling elements arranged on an annular raceway along the first and second raceway surfaces so as to contact the first and second raceway surfaces. The inner member includes a large diameter portion having the first raceway surface provided thereon, and a shaft portion extending in the axial direction from the large diameter portion and having at least a portion accommodated in the mounting hole. The fixing element includes a cylindrical portion disposed in the shaft through hole and having a threaded groove on an inner circumferential surface thereof, and a plate-shaped portion provided at one end in the axial direction of the cylindrical portion and extending radially outward. The fastening element fastens the follower bearing and the fixing element with the cylindrical portion being disposed in the shaft through hole. At least one of the follower bearing and the fixing element includes a rotation prevention mechanism operative to prevent rotation of the fixing element.

A follower bearing is mounted and fixed to a mounted member, such as a driven member, for example, in a state where the outer ring rotates. Specifically, the follower bearing is mounted such that a portion of the follower bearing called a stud, extending in the axial direction, is accommodated in a mounting hole provided in the mounted member. The follower bearing is then fixed to the mounted member such that the rotation of the outer ring is not obstructed. In mounting of the follower bearing, reduction in size of the installation space and improvement in convenience during mounting of the follower bearing are required.

According to the follower bearing module of the present disclosure, the follower bearing and the fixing element are fastened together with the fastening element in the state where the shaft portion is accommodated in the mounting hole and the cylindrical portion of the fixing element is disposed in the shaft through hole of the shaft portion. The plate-shaped portion of the fixing element has a relatively small wall thickness, and installation of the fixing element only requires a space having an axial length of approximately the plate thickness, thus enabling reduction in size of the installation space as compared to the case of fastening using nuts or the like. Further, the follower bearing module of the present disclosure includes the rotation prevention mechanism that prevents the rotation of the fixing element, so in fastening the follower bearing and the fixing element by rotating the fastening element, the rotation of the fixing element can be prevented utilizing the rotation prevention mechanism. Therefore, according to the follower bearing module as described above, it is possible to reduce the size of the installation space and improve the convenience during mounting of the follower bearing.

In the above follower bearing module, the cylindrical portion and the plate-shaped portion may be equal in thickness. The fixing element with such a configuration can be produced by press forming, for example. This enables efficient production of the fixing element, leading to improved productivity. As used herein, equal in thickness means that the ratio of the thickness of the plate-shaped portion to that of the cylindrical portion is 1 or more and 1.3 or less.

In the above follower bearing module, the rotation prevention mechanism may include a notch provided at an end in the axial direction of the shaft portion, and a protruding portion provided on an outer circumferential surface of the cylindrical portion to protrude radially outward and to fit into the notch. Such a rotation prevention mechanism prevents rotation of the fixing element during tightening of the fastening element, by the protruding portion being fitted into and caught by the notch, thereby preventing so-called co-rotation of the fastening element and the fixing element. The follower bearing can thus be mounted more reliably.

In the above follower bearing module, a plurality of notches and a plurality of protruding portions may be provided spaced apart from each other in a circumferential direction of the shaft portion. This allows the rotation of the fixing element to be prevented more reliably by the plurality of protruding portions fitted into the plurality of notches.

In the above follower bearing module, a plate-shaped portion through hole penetrating through the plate-shaped portion may be provided on a radially outer side of the protruding portion. With this, particularly in the case of producing the fixing element by press forming, for example, the protruding portion can be easily formed by deforming a portion of the plate-shaped portion utilizing the plate-shaped portion through hole. This can further improve the productivity.

In the above follower bearing module, the rotation prevention mechanism may include a notch provided at an end in the axial direction of the shaft portion, a protruding portion provided on an outer circumferential surface of the cylindrical portion to protrude radially outward and to fit into the notch, a first portion and a second portion provided in the plate-shaped portion, the first portion having a first length in the radial direction, the second portion having a second length longer than the first length in the radial direction, and a hole portion provided in the plate-shaped portion to be recessed from a surface on one side in the thickness direction thereof, the hole portion having portions with different diameters. With the above, during tightening of the fastening element, the protruding portion being fitted into and caught by the notch prevents the rotation of the fixing element, thus preventing the so-called co-rotation of the fastening element and the fixing element. In addition, a tool suppressing the rotation of the fixing element can be attached utilizing at least one of the first and second portions and the hole portion, according to the installation conditions of the follower bearing, to prevent the rotation of the fixing element during tightening of the fastening element. Therefore, the mounting can be done utilizing any one or more of the rotation prevention mechanism according to the circumstances, leading to further improvement in convenience.

In the above follower bearing module, the cylindrical portion and the plate-shaped portion may differ in thickness. The fixing element with such a configuration can be produced, for example, by forging, specifically by cold forging. This increases the degree of freedom in design, making the fixing element more conforming to the user requirements. As used herein, differing in thickness means that the ratio of the thickness of the plate-shaped portion to that of the cylindrical portion is less than 1 or more than 1.3.

In the above follower bearing module, the plate-shaped portion may be greater in thickness than the cylindrical portion. This ensures sufficient strength of the plate-shaped portion, which mainly contacts the mounted member. Therefore, the follower bearing can be mounted more firmly.

In the above follower bearing module, in a cross section of the fixing element cut in a plane including a center of the shaft through hole, a circular arc surface may be formed in a region where a surface of the plate-shaped portion and an outer circumferential surface of the cylindrical portion are connected. With this, no corner is included in the region connecting the surface of the plate-shaped portion and the outer circumferential surface of the cylindrical portion, suppressing the occurrence of a position where stress is concentrated. It is therefore possible to prevent the fixing element from being damaged due to stress concentration, enabling the follower bearing to be mounted more stably.

In the above follower bearing module, the circular arc surface may have a radius of not less than 0.5 mm and not more than 1.5 mm. Setting the radius of the circular arc surface to 0.5 mm or more can more reliably suppress the occurrence of a position where stress is concentrated. Setting the radius of the circular arc surface to 1.5 mm or less can more reliably reduce the risk of interference between the inner member included in the follower bearing and the fixing element during mounting. Thus, setting as above allows more stable and secure mounting of the follower bearing.

In the above follower bearing module, the rotation prevention mechanism may include a first portion and a second portion provided in the plate-shaped portion, the first portion having a first length in a radial direction, the second portion having a second length longer than the first length in the radial direction. Such a rotation prevention mechanism makes it possible to prevent rotation of the fixing element by allowing a tool suppressing the rotation of the fixing element to be attached utilizing the portions of the plate-shaped portion having different lengths in the radial direction. In this case, the tool can clamp the fixing element from its radially outer side to prevent the fixing element from rotating, so the rotation of the fixing element can be prevented more efficiently.

In the above follower bearing module, a portion of an outer circumferential surface of the plate-shaped portion corresponding to the first portion may include a flat surface. A portion of the outer circumferential surface of the plate-shaped portion corresponding to the second portion may include a circular arc surface. This allows the rotation of the fixing element to be prevented more reliably with the tool suppressing the rotation of the fixing element being brought into close contact with the portion of the outer circumferential surface of the plate-shaped portion corresponding to the first portion.

In the above follower bearing module, the portion of the outer circumferential surface of the plate-shaped portion corresponding to the first portion may include a plurality of flat surfaces spaced apart from each other in a circumferential direction and arranged in parallel. This can more reliably prevent the rotation of the fixing element by utilizing the plurality of flat surfaces.

In the above follower bearing module, the rotation prevention mechanism may include a hole portion provided in the plate-shaped portion to be recessed from a surface on one side in a thickness direction thereof, the hole portion having portions with different diameters. Such a rotation prevention mechanism can suppress the rotation of the fixing element during tightening of the fastening element, with a tool suppressing the rotation of the fixing element being fitted into the hole portion. In this case, even if a member interfering with the tool is placed on the radially outer side of the plate-shaped portion, the tool can be fitted into the hole portion in the axial direction. It is therefore possible to more efficiently prevent the rotation of the fixing element.

In the above follower bearing module, the hole portion may include a hexagon socket. This allows a hexagon socket screw key to be fitted into the hole portion to suppress rotation of the fixing element during tightening of the fastening element, whereby the rotation of the fixing element can be prevented more reliably.

In the above follower bearing module, the plate-shaped portion may be in a flat plate shape. The hole portion may be formed to extend, in the axial direction of the cylindrical portion, from the threaded groove to the surface on the one side of the plate-shaped portion. This can secure a large contact area with the mounted member in the flat plate-shaped portion. Since the hexagon socket extends from the threaded groove to the surface on one side of the plate-shaped portion, the fixing element itself can be reduced in size, thereby facilitating reduction in size of the installation space.

In the above follower bearing module, the plate-shaped portion may have a thickness of not less than 1 mm and not more than 5 mm. With such a fixing element, it is possible to achieve reliable fixation by securing minimum rigidity of the plate-shaped portion while reducing the size of the installation space. From the standpoint of further size reduction of the installation space, the thickness of the plate-shaped portion is further preferably 1 mm or more and 3 mm or less.

The follower bearing fixing element of the present disclosure is a follower bearing fixing element that is included in a follower bearing module for mounting a follower bearing to a mounted member having a mounting hole and that is operative to fix the follower bearing to the mounted member. The follower bearing fixing element includes: a cylindrical portion disposed in a shaft through hole and having a threaded groove on an inner circumferential surface thereof; a plate-shaped portion provided at one end in an axial direction of the cylindrical portion and extending radially outward; a protruding portion provided on an outer circumferential surface of the cylindrical portion and protruding radially outward; a first portion and a second portion provided in the plate-shaped portion, the first portion having a first length in a radial direction, the second portion having a second length longer than the first length in the radial direction; and a hole portion provided in the plate-shaped portion to be recessed from a surface on one side in a thickness direction thereof, the hole portion having portions with different diameters.

According to such a follower bearing fixing element, the plate-shaped portion of the fixing element has a relatively small wall thickness, and installation of the fixing element only requires a space having an axial length of approximately the plate thickness, thus enabling reduction in size of the installation space as compared to the case of fastening using nuts or the like. Further, during mounting of the follower bearing, the protruding portion can be utilized to prevent the so-called co-rotation of the fastening element and the fixing element. In addition, a tool suppressing the rotation of the fixing element can be attached utilizing at least one of the first and second portions and the hole portion according to the installation conditions of the follower bearing, to prevent the rotation of the fixing element during tightening of the fastening element. Therefore, the mounting can be done utilizing any one or more of the rotation prevention mechanism according to the circumstances, leading to further improvement in convenience. From the above, such a follower bearing fixing element makes it possible to reduce the size of the installation space and improve the convenience during mounting of the follower bearing.

SPECIFIC EMBODIMENTS

Specific embodiments of the follower bearing module of the present disclosure will be described below with reference to the drawings. In the drawings referenced below, the same or corresponding portions are denoted by the same reference numerals and the description thereof will not be repeated.

Embodiment 1

Figure 2:
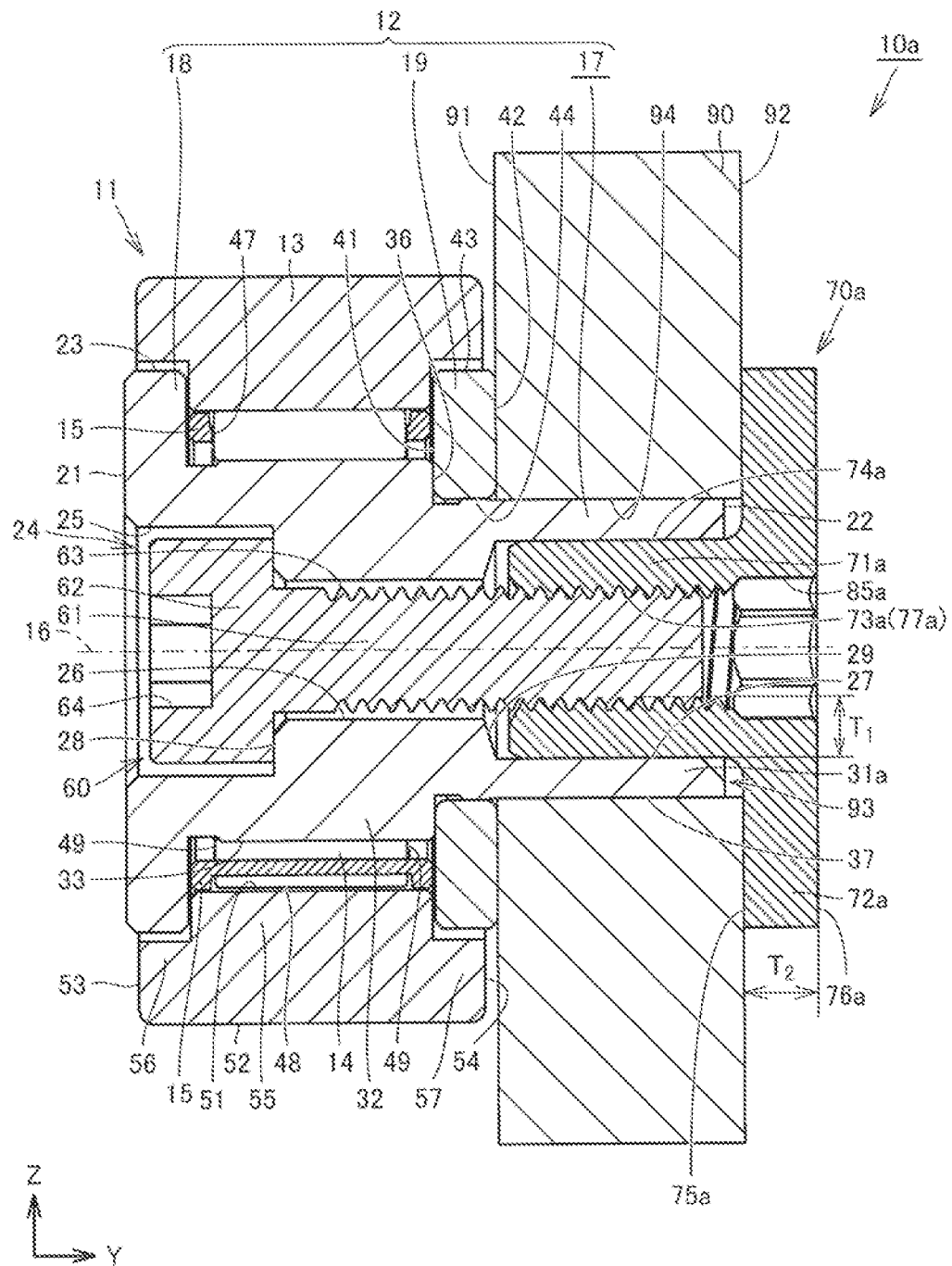
FIG. 2 is a schematic cross-sectional view when cut in a cross section indicated by II-II in FIG. 1.
Figure 3:
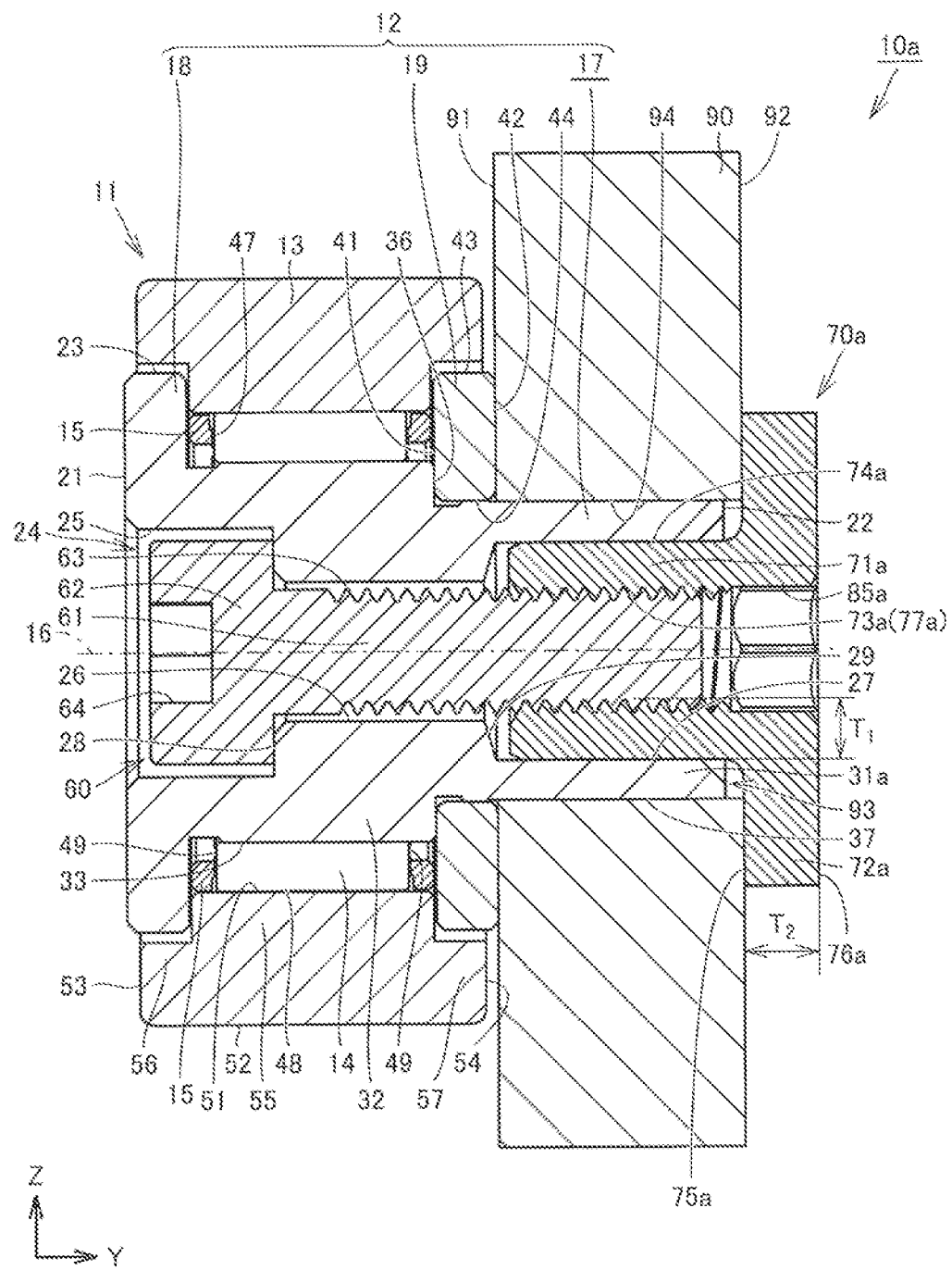
FIG. 3 is a schematic cross-sectional view when cut in a cross section indicated by III-III in FIG. 1.
Figure 4:
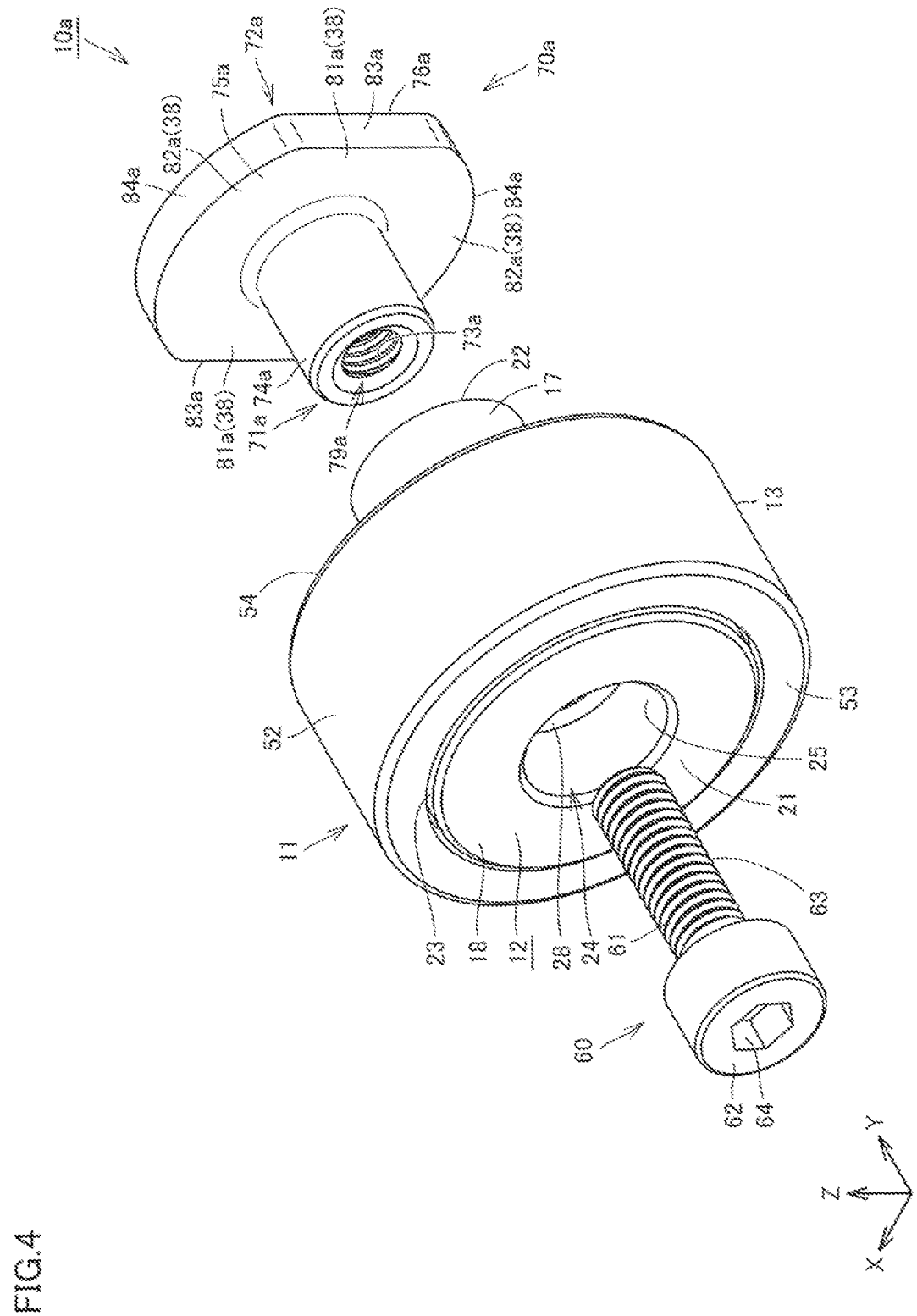
FIG. 4 is an exploded perspective view schematically illustrating the follower bearing module shown in FIG. 1.

Embodiment 1, an embodiment of the present disclosure, will be described first. FIG. 1 is a schematic perspective view of a follower bearing module in Embodiment 1 of the present disclosure. FIG. 2 is a schematic cross-sectional view when cut in a cross section indicated by II-II in FIG. 1. FIG. 3 is a schematic cross-sectional view when cut in a cross section indicated by III-III in FIG. 1. FIG. 4 is an exploded perspective view schematically illustrating the follower bearing module shown in FIG. 1. In FIG. 4, a mounted member, described later, is not shown. In FIG. 1 and on, the Y direction indicates the axial direction of the follower bearing. The X and Z directions indicate radial directions from the center of the follower bearing as viewed in the axial direction. In other words, the X and Z directions are directions when the direction of the central axis of rotation of the follower bearing is the Y direction. The X direction is orthogonal to the Z direction in a plane perpendicular to the axial direction.

Referring to FIGS. 1, 2, 3, and 4, the follower bearing module 10a in Embodiment 1 includes a follower bearing 11, a fixing element 70a, and a bolt 60 as a fastening element. The follower bearing module 10a is mounted to a mounted member 90 having a predetermined thickness, such as a driven member, for example. In FIG. 1, the mounted member 90 is indicated with long dashed short dashed lines. The mounted member 90 has a mounting hole 93 provided to penetrate therethrough from a first surface 91 to a second surface 92. The follower bearing 11 is mounted to the mounted member 90 utilizing this mounting hole 93. The mounting hole 93 is in a round hole shape and penetrates straight in the Y direction, which is the axial direction of the follower bearing 11. That is, an inner wall surface 94 constituting the mounting hole 93 is a cylindrical surface. Such a mounting hole 93 can be formed by drilling a so-called straight hole, which is easier to form than a mounting hole with a stepped inner wall surface, for example.

Here, the configuration of the follower bearing 11 is briefly described first. The follower bearing 11 includes a shaft member 12 as an inner member, an outer ring 13, a plurality of rollers 14 as rolling elements, and a cage 15 for retaining the rollers 14. In FIGS. 2 and 3, a rotational axis 16, which is the central axis of the shaft member 12, is indicated with a long dashed short dashed line.

The shaft member 12 includes a body portion 17 having a rod shape, a flange portion 18 formed at one end of the body portion 17 and having a greater diameter than the body portion 17, and a side plate 19, which is a ring disposed coaxially with the body portion 17 so as to circumferentially surround a portion of an outer circumferential surface of the body portion 17. The body portion 17 has a first end surface 21, which is one end in the axial direction, and a second end surface 22, which is another end opposite to the first end surface 21. The first end surface 21 has a circular planar shape. The second end surface 22 has a circular planar shape, except for portions where notches 34 and 35, described later, are provided. The annular flange portion 18 has an outer circumferential surface 23 that faces the outer ring 13.

The shaft member 12 has a shaft through hole 24 formed to penetrate in the axial direction from the first end surface 21 to the second end surface 22. The shaft through hole 24 has round hole-shaped openings at the first end surface 21 side and the second end surface 22 side. In the axial direction, a first region 25 of the shaft through hole 24, located on the first end surface 21 side, has an inside diameter greater than an inside diameter of a second region 26, adjacent to the first region 25 on the axially center side. In the axial direction, a third region 27 of the shaft through hole 24, located on the second end surface 22 side, has an inside diameter greater than the inside diameter of the second region 26, adjacent to the third region 27 on the axially center side. The inside diameter of the first region 25 is greater than that of the third region 27. It should be noted that the inside diameters of the second region 26 and the third region 27 are greater than an outside diameter of a body 61 of the bolt 60, which will be described later. Between the first region 25 and the second region 26, a stepped surface 28 is provided which includes a radially extending flat surface. In mounting of the follower bearing 11, this stepped surface 28 comes into contact with a head 62 of the bolt 60, described later, in the axial direction Between the third region 27 and the second region 26, a stepped surface 29 is provided which includes an axially inclined surface. It should be noted that the inner circumferential surface of the shaft through hole 24 has no threaded groove and is configured with surfaces straight in the axial direction. The length in the axial direction of the third region 27 is longer than the length in the axial direction of a cylindrical portion 71a of the fixing element 70a, which will be described later.

The body portion 17 includes a shaft portion 31a of a hollow cylindrical shape, and a large diameter portion 32, greater in diameter than the shaft portion 31a, arranged between the shaft portion 31a and a region where the flange portion 18 is located in the axial direction. The shaft portion 31a, facing the inner wall surface 94 of the mounting hole 93 of the mounted member 90, has an outside diameter of about the size to fit into the mounting hole 93 of the mounted member 90. In other words, in mounting of the follower bearing 11, the shaft portion 31a is arranged such that its outer circumferential surface 37 faces the inner wall surface 94 of the mounting hole 93. The outside diameter of the large diameter portion 32 is smaller than the outside diameter of the flange portion 18. The large diameter portion 32 has an outer circumferential surface on which a first raceway surface 33 having a cylindrical surface shape is formed. In other words, the shaft member 12 has the annular first raceway surface 33 on its outer circumferential surface. In the present embodiment, the body portion 17 includes the large diameter portion 32, having the first raceway surface 33 provided thereon, and the shaft portion 31a, extending from the large diameter portion 32 in the axial direction and accommodated in the mounting hole 93. At an end surface of the large diameter portion 32 on the shaft portion 31a side in the axial direction, a radially extending stepped surface 36 is formed.

In the present embodiment, the outer circumferential surface 37 of the shaft portion 31a is a cylindrical surface. Such a configuration can simplify the configuration of the shaft portion 31a.

The annular side plate 19 has a first end surface 41, which is one end surface, a second end surface 42, which is another end surface, an outer circumferential surface 43, and an inner circumferential surface 44. The first end surface 41 and the second end surface 42 are in parallel. The outer circumferential surface 43 and the inner circumferential surface 44 are concentric cylindrical surfaces. The side plate 19 is disposed so as to contact the stepped surface 36, which is the end surface of the large diameter portion 32 on the shaft portion 31a side, at its first end surface 41. The side plate 19 has an inside diameter slightly greater than an outside diameter of a region of the shaft portion 31a fitting into the mounting hole 93. The shaft portion 31a has, at its end on one side, a portion with a greater outside diameter than the region fitting into the mounting hole 93, and the side plate 19 is press-fitted to this portion with the greater outside diameter of the shaft portion 31a, and secured with respect to the large diameter portion 32. The shaft member 12 is made of a steel such as carbon steel for machine structural use, alloy steel for machine structural use, bearing steel, or the like. Of the shaft member 12, a region of the body portion 17 including at least the first raceway surface 33 may be quench-hardened. A portion or the whole of the side plate 19 may also be quench-hardened.

The outer ring 13 has an annular shape. The outer ring 13 has, on its inner circumferential surface, an annular second raceway surface 51 that faces the first raceway surface 33. The outer ring 13 also has an annular outer circumferential surface 52, a first end surface 53, and a second end surface 54. In the present embodiment, the outer circumferential surface 52 is a cylindrical surface, except for both ends in the axial direction, which are chamfered. In the axial direction, a central portion 55 of the outer ring 13, provided with the first raceway surface 33, has a thickness in the radial direction greater than those of one end 56 including the first end surface 53 and another end 57 including the second end surface 54. The one end 56 including the first end surface 53 has its inner circumferential surface recessed radially outward so as to receive the flange portion 18 of the shaft member 12. The other end 57 including the second end surface 54 has its inner circumferential surface recessed radially outward so as to receive the side plate 19. In other words, the outer ring 13 is configured to be thicker at the central portion 55 in the axial direction and thinner at both ends 56 and 57 in the axial direction.

The outer ring 13 is made of a steel. For the steel constituting the outer ring 13, a bearing steel, carbon steel for machine structural use, alloy steel for machine structural use, or the like, for example, can be adopted. The outer ring 13 may be quench-hardened.

The cage 15 has an annular shape. In the present embodiment, the cage 15 is made of a steel. It should be noted that the cage 15 may be made of a resin. The cage 15 is arranged in a space sandwiched between the shaft member 12 and the outer ring 13, concentrically with the shaft member 12 and the outer ring 13. The cage 15 has a plurality of pockets 47 arranged at equal intervals in the circumferential direction. One roller 14 is disposed in each of the plurality of pockets 47. The rollers 14, thus retained in the cage 15, are arranged on an annular raceway along the first raceway surface 33 and the second raceway surface 51, so as to contact the first raceway surface 33 and the second raceway surface 51. Each roller 14 has a solid cylindrical shape. Each roller 14 includes a cylindrical outer circumferential surface 48 and a pair of flat end surfaces 49. The end surfaces 49 of the roller 14 may be spherical. The rollers 14 are in contact with the first raceway surface 33 and the second raceway surface 51 at their outer circumferential surfaces 48. The rollers 14 are made of a steel, such as bearing steel, for example. The rollers 14 may be quench-hardened.

It should be noted that the bolt 60 as the fastening element includes a body 61 extending in the axial direction, and a head 62 arranged at an end on one side in the axial direction of the body 61. The body 61 has an outer circumferential surface 63 provided with threads. The head 62 has an axial end provided with a recess 64 that is recessed in the axial direction. The recess 64 is a hexagon socket recessed in a regular hexagonal column shape, enabling tightening of the bolt 60 with a hexagon socket screw key inserted into the recess 64.

Figure 5:
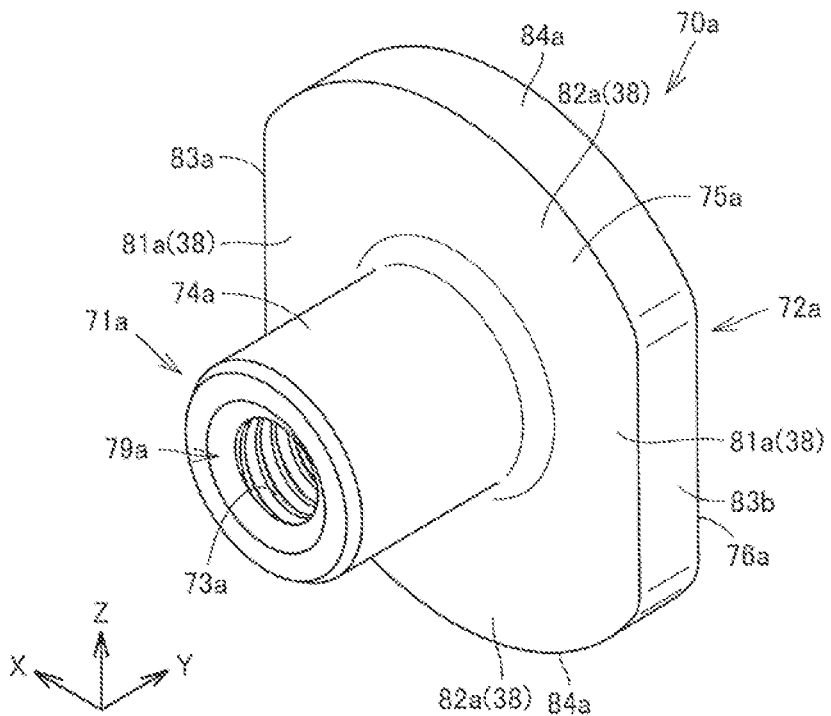
FIG. 5 is a schematic perspective view of a fixing element included in the follower bearing module of Embodiment 1.
Figure 6:
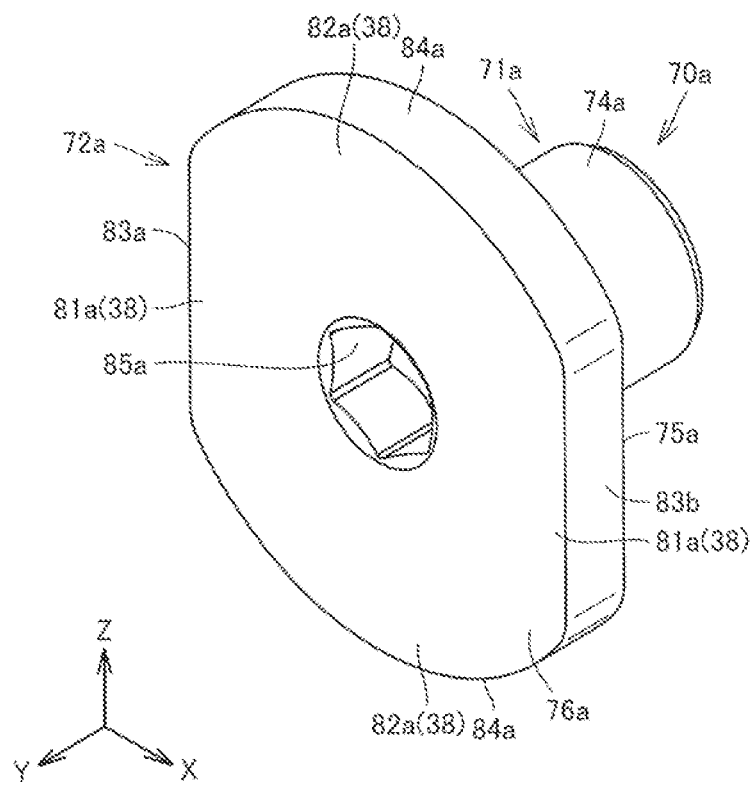
FIG. 6 is a schematic perspective view of the fixing element included in the follower bearing module of Embodiment 1.
Figure 7:
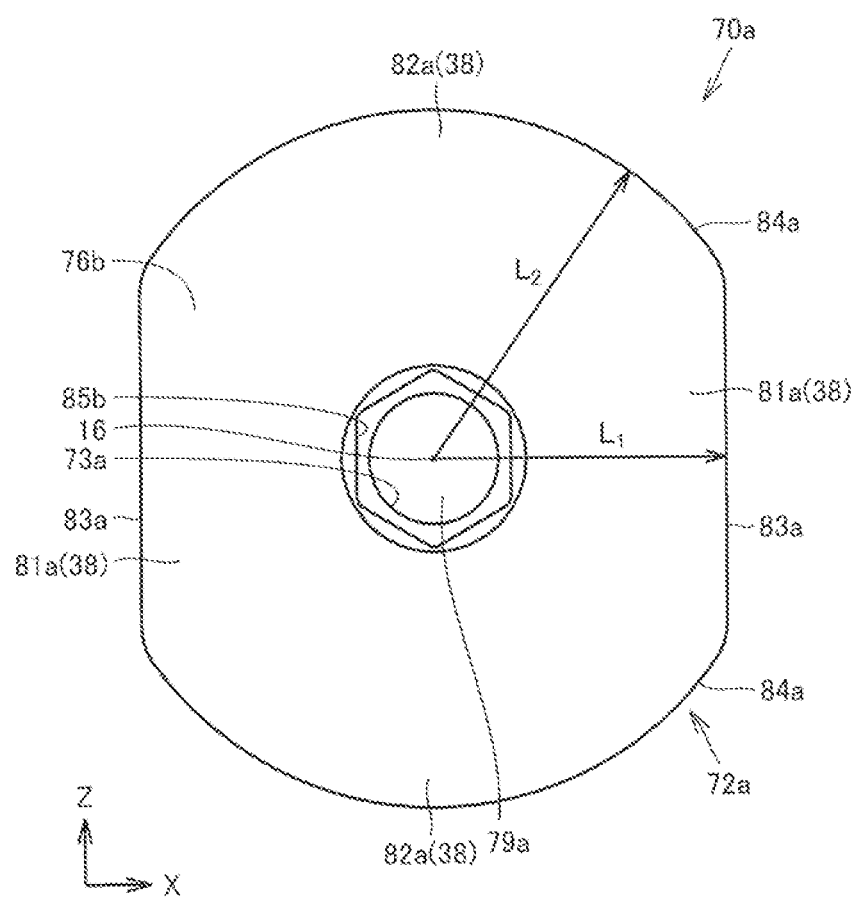
FIG. 7 is a schematic rear view of the fixing element included in the follower bearing module of Embodiment 1.
Figure 8:
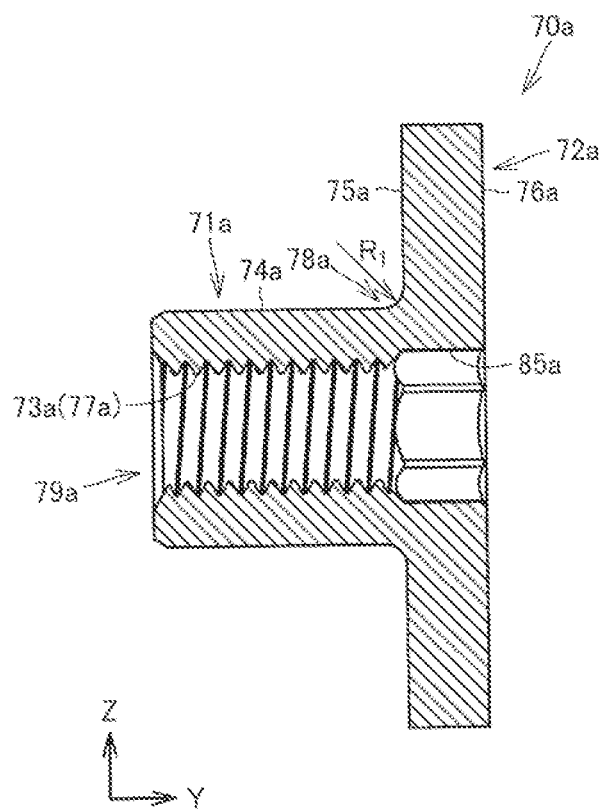
FIG. 8 is a schematic cross-sectional view of the fixing element included in the follower bearing module of Embodiment 1.

The configuration of the fixing element 70a is now described. FIGS. 5 and 6 are schematic perspective views of the fixing element 70a included in the follower bearing module 10a of Embodiment 1. FIGS. 5 and 6 are views from different directions. FIG. 7 is a schematic rear view of the fixing element 70a included in the follower bearing module 10a of Embodiment 1. FIG. 7 is a view of the fixing element 70a from a direction opposite to the arrow Y. FIG. 8 is a schematic cross-sectional view of the fixing element 70a. FIG. 8 is a cross section of the fixing element 70a cut in a plane including the center of the shaft through hole 24. The cross section shown in FIG. 8 is parallel to the Y-Z plane.

Referring to FIGS. 5, 6, 7, and 8 as well, the fixing element 70a includes a cylindrical portion 71a and a plate-shaped portion 72a. The cylindrical portion 71a is disposed in the shaft through hole 24. The cylindrical portion 71a has a through hole 79a formed to penetrate in the axial direction. The cylindrical portion 71a includes an inner circumferential surface 73a and an outer circumferential surface 74a. The outer circumferential surface 74a is a cylindrical surface. The cylindrical portion 71a has an outside diameter smaller than the inside diameter of the shaft through hole 24 in the third region 27. It should be noted that the inside diameter of the second region 26 of the shaft through hole 24 of the body portion 17 is smaller than the outside diameter of the cylindrical portion 71a. The cylindrical portion 71a has a threaded groove 77a provided on the inner circumferential surface 73a.

The plate-shaped portion 72a is provided at one end in the axial direction of the cylindrical portion 71a. The plate-shaped portion 72a has a shape extending radially outward. The plate-shaped portion 72a is in a flat plate shape. The plate-shaped portion 72a has no holes and no irregularities except for a region where a hexagon socket is formed, which will be described later. The plate-shaped portion 72a includes a surface (first surface) 75a located on one side in the thickness direction (axial direction), and a surface (second surface) 76a located on the opposite side in the thickness direction. The cylindrical portion 71a has a thickness $T_1$ different from a thickness $T_2$ of the plate-shaped portion 72a. Specifically, the thickness $T_2$ of the plate-shaped portion 72a is greater than the thickness $T_1$ of the cylindrical portion 71a. The thickness Ty of the cylindrical portion 71a is a thickness in the radial direction between the inner circumferential surface 73a and the outer circumferential surface 74a. The thickness $T_1$ of the cylindrical portion 71a is a length in the radial direction between the tip end in the radial direction of the threaded groove 77a formed on the inner circumferential surface 73a and the outer circumferential surface 74a The thickness $T_2$ of the plate-shaped portion 72a is a thickness in the thickness direction (axial direction) between the surface (first surface) 75a and the surface (second surface) 76a. The thickness $T_2$ of the plate-shaped portion 72a is not less than 1 mm and not more than 5 mm. In the present embodiment, the thickness $T_2$ of the plate-shaped portion 72a is 2 mm. The fixing element 70a with such a configuration can be produced, for example, by forging, specifically by cold forging. This increases the degree of freedom in design, making the fixing element 70a more conforming to the user requirements. The thickness $T_2$ of the plate-shaped portion 72a is greater than the thickness $T_1$ of the cylindrical portion 71a. This secures sufficient strength for the plate-shaped portion 72a, which mainly contacts the mounted member. Thus, the follower bearing 11 can be mounted more firmly. The production of the fixing element 70a will be described in detail later.

In the cross section shown in FIG. 8, a circular arc surface 78a is formed in a region where the surface (first surface) 75a of the plate-shaped portion 72a and the outer circumferential surface 74a of the cylindrical portion 71a are connected. The circular arc surface 78a has a radius $R_1$ of not less than 0.5 mm and not more than 1.5 mm. In the present embodiment, the radius $R_1$ of the circular arc surface 78a is 0.8 mm.

The plate-shaped portion 72a has a circular external shape partially cut off, as viewed in the axial direction (Y direction), which is the thickness direction of the plate-shaped portion 72a. The plate-shaped portion 72a includes a first portion 81a, serving as a rotation prevention mechanism 38, having a first length $L_1$ in the radial direction, and a second portion 82a, serving as the rotation prevention mechanism 38, having a second length $L_2$ longer than the first length in the radial direction (see in particular FIG. 7). Here, the length in the radial direction is the length from the rotational axis 16 to the outer circumferential surface. An outer circumferential surface 83a of the plate-shaped portion 72a corresponding to the first portion 81a is a flat surface. An outer circumferential surface 84a of the plate-shaped portion 72a corresponding to the second portion 82a is a circular arc surface. There are provided a plurality of first portions 81a, two in the present embodiment, and the outer circumferential surfaces 83a of the plate-shaped portion 72a corresponding to the first portions 81a are spaced apart from each other in the circumferential direction and arranged in parallel. The outer circumferential surfaces 83a of the respective first portions 81a and the outer circumferential surfaces 84a of the respective second portions 82a are configured to be connected to each other. In other words, the outer circumferential surface of the plate-shaped portion 72a has a shape obtained by cutting a circular outer circumferential surface as viewed in the axial direction, at two symmetrical locations at equal distances from the rotational axis 16 in the X direction, using a plane including the rotational axis 16 and parallel to the Y-Z plane. On these two first portions 81a, a clamping tool such as an open-end wrench, serving as a tool suppressing the rotation of the fixing element 70a, can be attached in a manner of clamping the plate-shaped portion 72a from the radially outer side.

The plate-shaped portion 72a also includes a hole portion 85a, serving as the rotation prevention mechanism 38, provided to be recessed from a surface on one side in the thickness direction. That is, the hole portion 85a has a shape recessed in the axial direction. The hole portion 85a has portions with different diameters. In the present embodiment, the hole portion 85a is a hexagon socket. The hole portion 85a is formed to extend from the threaded groove 77a to the surface 76a on one side of the plate-shaped portion 72a in the axial direction of the cylindrical portion 71a. A hexagon socket screw key, as the tool suppressing the rotation of the fixing element 70a, can be fitted into this hole portion 85a in the axial direction.

An example of the mounting process in mounting the follower bearing 11 to the mounted member 90 is now described in brief. First, the shaft portion 31a of the body portion 17 of the follower bearing 11 assembled is advanced in the direction indicated by the arrow Y and inserted into the mounting hole 93 of the mounted member 90. At this time, the inner wall surface 94 of the mounting hole 93 comes to face the outer circumferential surface 37 of the shaft portion 31a in the radial direction. Further, in the axial direction, the second end surface 42 of the side plate 19 comes to contact the first surface 91 of the mounted member 90. It should be noted that a gap is formed between the second end surface 54 of the outer ring 13 and the first surface 91 of the mounted member 90 in the axial direction.

Subsequently, the fixing element 70a is mounted to the mounted member 90 in the axial direction, from the side opposite to the follower bearing 11, i.e., from the second surface 92 side of the mounted member 90. At this time, the fixing element 70a is inserted in the direction opposite to the arrow Y such that the cylindrical portion 71a is fitted into the shaft through hole 24. Here, the outer circumferential surface 74a of the cylindrical portion 71a comes to face the inner circumferential surface of the shaft through hole 24 in the third region 27. Thereafter, the bolt 60 as the fastening element is inserted in the direction of the arrow Y, from the first region 25 side into the shaft through hole 24. The bolt 60 is then rotated for tightening.

At this time, the follower bearing 11 is mounted to the mounted member 90 through tightening of the bolt 60, while preventing the rotation of the fixing element 70a utilizing the rotation prevention mechanism 38. Specifically, in the case where there is an obstacle on the second surface 92 side of the mounted member 90, a hexagon socket screw key is inserted and fitted into the hole portion 85a, to prevent the rotation of the fixing element 70a. If there is no obstacle on the second surface 92 side of the mounted member 90, then a clamping tool such as an open-end wrench is used to clamp and hold the plate-shaped portion 72a utilizing the two first portions 81a, to prevent the rotation of the fixing element 70a.

According to the follower bearing module 10a with the above configuration, the follower bearing 11 and the fixing element 70a are fastened together with the bolt 60 in the state where the shaft portion 31a is accommodated in the mounting hole 93 and the cylindrical portion 71a of the fixing element 70a is disposed in the shaft through hole 24 of the shaft portion 31a. The plate-shaped portion 72a of the fixing element 70a has a relatively small wall thickness, and installation of the fixing element 70a only requires a space having an axial length of approximately the plate thickness, thus enabling reduction in size of the installation space as compared to the case of fastening using nuts or the like.

Further, the follower bearing module 10a with the above configuration includes the rotation prevention mechanism 38, which prevents the rotation of the fixing element 70a. Thus, in fastening the follower bearing 11 and the fixing element 70a by rotating the bolt 60, the rotation prevention mechanism 38 can be utilized to prevent the rotation of the fixing element 70a. Therefore, such a follower bearing module 10a makes it possible to reduce the size of the installation space and improve the convenience during mounting of the follower bearing 11.

In the present embodiment, in the cross section of the fixing element 70a cut in a plane including the center of the shaft through hole 24, the circular arc surface 78a is formed in the region where the surface 75a of the plate-shaped portion 72a and the outer circumferential surface 74a of the cylindrical portion 71a are connected. This means that no corner is included in the region connecting the surface 75a of the plate-shaped portion 72a and the outer circumferential surface 74a of the cylindrical portion 71a, suppressing the occurrence of a position where stress is concentrated. It is therefore possible to prevent the fixing element 70a from being damaged due to stress concentration, enabling the follower bearing 11 to be mounted more stably.

In the follower bearing module described above, the radius $R_1$ of the circular arc surface 78a is 0.5 mm or more and 1.5 mm or less. Setting the radius $R_1$ of the circular arc surface 78a to 0.5 mm or more can more reliably suppress the occurrence of a position where stress is concentrated. Setting the radius $R_1$ of the circular arc surface 78a to 1.5 mm or less can more reliably reduce the risk of interference between the inner member included in the follower bearing 11 and the fixing element 70a during mounting. Thus, setting as above allows more stable and secure mounting of the follower bearing 11.

In the present embodiment, the rotation prevention mechanism 38 includes the first portion 81a and the second portion 82a provided in the plate-shaped portion 72a, the first portion 81a having the first length in the radial direction and the second portion 82a having the second length longer than the first length in the radial direction. Such a rotation prevention mechanism 38 makes it possible to prevent rotation of the fixing element 70a during tightening of the bolt 60, by allowing a tool suppressing the rotation of the fixing element 70a, e.g. a clamping tool such as an open-end wrench, to be attached utilizing the portions of the plate-shaped portion 72a having different lengths in the radial direction. In this case, the tool can clamp the fixing element 70a from its radially outer side to prevent the fixing element 70a from rotating, so the rotation of the fixing element 70a can be prevented more efficiently.

In the present embodiment, the outer circumferential surface 83a of the plate-shaped portion 72a corresponding to the first portion 81a includes a flat surface. The outer circumferential surface 84a of the plate-shaped portion 72a corresponding to the second portion 82a includes a circular arc surface. It is thus possible to more reliably prevent the rotation of the fixing element 70a by bringing the tool suppressing the rotation of the fixing element 70a into close contact with the outer circumferential surface 83a of the plate-shaped portion 72a corresponding to the first portion 81a.

In the present embodiment, the outer circumferential surface 83a of the plate-shaped portion 72a corresponding to the first portion 81a includes a plurality of flat surfaces spaced apart from each other in the circumferential direction and arranged in parallel. This makes it possible to utilize the plurality of flat surfaces to more reliably prevent the rotation of the fixing element 70a.

In the present embodiment, the rotation prevention mechanism 38 includes the hole portion 85a provided in the plate-shaped portion 72a to be recessed from a surface on one side in its thickness direction, the hole portion 85a having portions with different diameters. Such a rotation prevention mechanism 38 can suppress the rotation of the fixing element 70a during tightening of the bolt 60, with the tool suppressing the rotation of the fixing element 70a being fitted into the hole portion 85a. In this case, even if a member interfering with the tool is placed on the radially outer side of the plate-shaped portion 72a, the tool can be fitted into the hole portion 85a in the axial direction. It is thus possible to prevent the rotation of the fixing element 70a more efficiently.

The hole portion 85a includes the hexagon socket. Thus, during tightening of the bolt 60, the rotation of the fixing element 70a can be suppressed by using a hexagon socket screw key and fitting it into the hole portion 85a, thereby more reliably preventing the rotation of the fixing element 70a.

Embodiment 2

Figure 9:
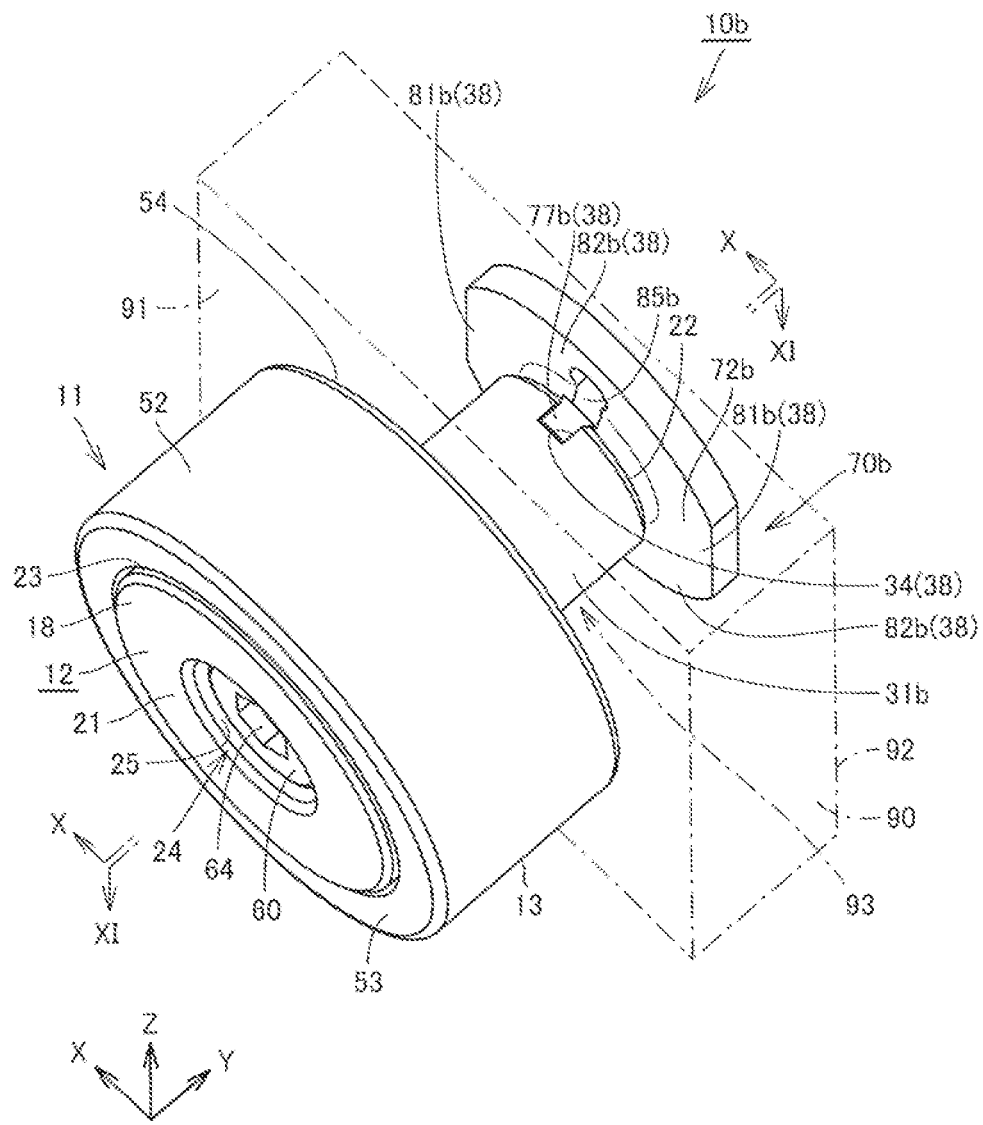
FIG. 9 is a schematic perspective view of a follower bearing module in Embodiment 2 of the present disclosure.
Figure 10:
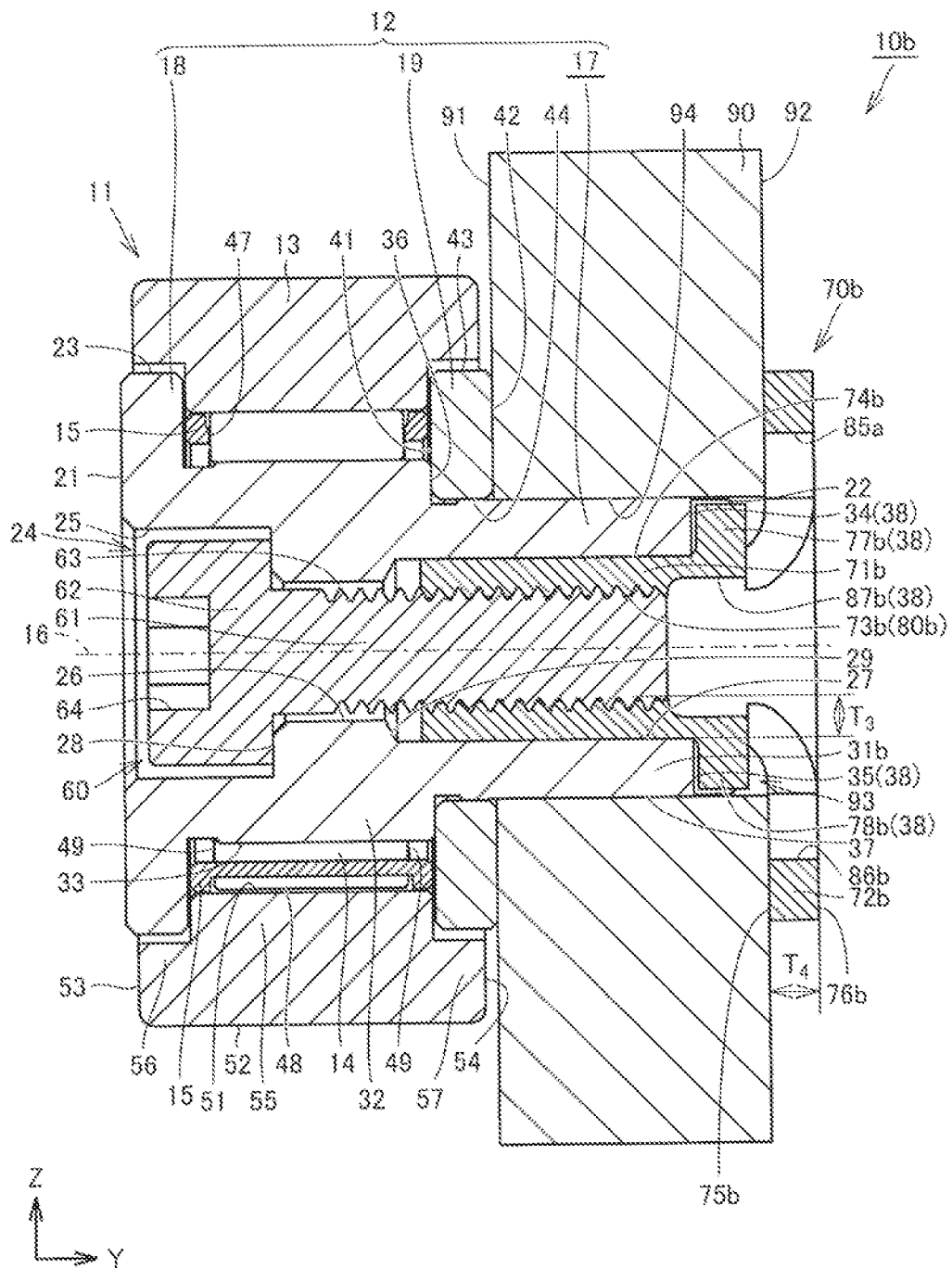
FIG. 10 is a schematic cross-sectional view when cut in a cross section indicated by X-X in FIG. 9.
Figure 11:
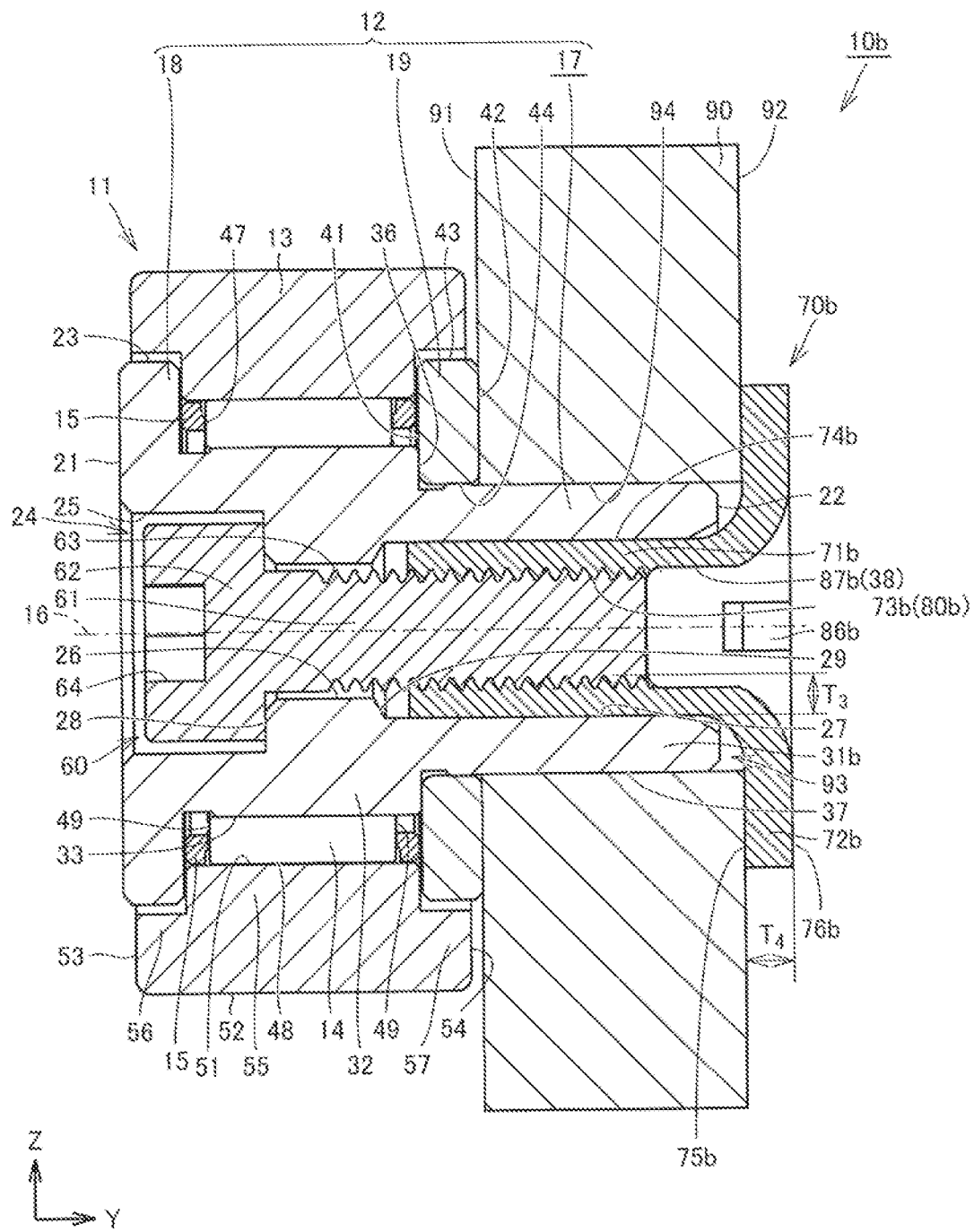
FIG. 11 is a schematic cross-sectional view when cut in a cross section indicated by XI-XI in FIG. 9.
Figure 12:
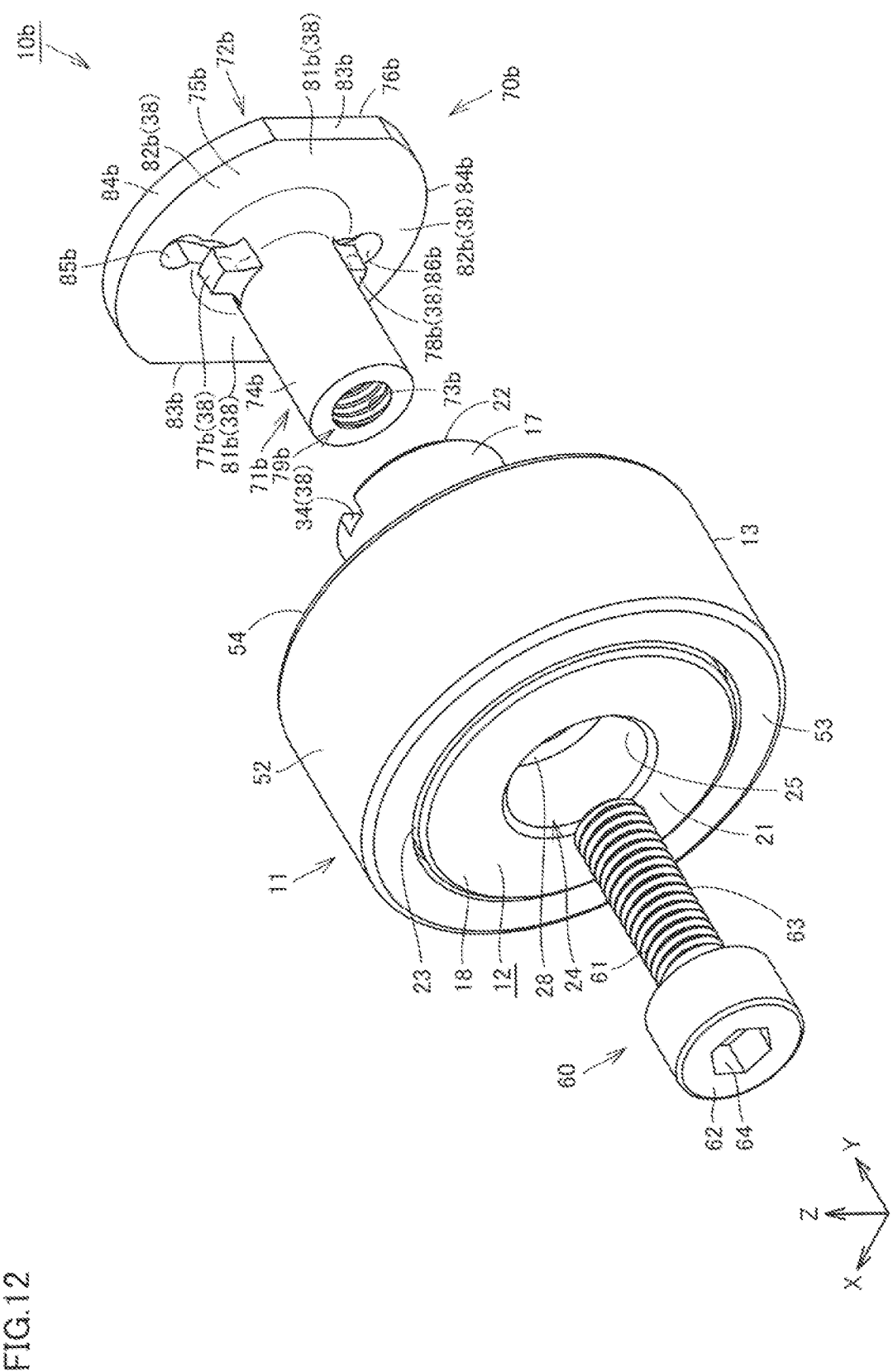
FIG. 12 is an exploded perspective view schematically illustrating the follower bearing module shown in FIG. 9.

Another embodiment, Embodiment 2, will now be described. FIG. 9 is a schematic perspective view of a follower bearing module in Embodiment 2 of the present disclosure. FIG. 10 is a schematic cross-sectional view when cut in a cross section indicated by X-X in FIG. 9. FIG. 11 is a schematic cross-sectional view when cut in a cross section indicated by XI-XI in FIG. 9. FIG. 12 is an exploded perspective view schematically illustrating the follower bearing module shown in FIG. 9. In FIG. 12, a mounted member is not shown. The follower bearing module in Embodiment 2 basically has a similar configuration and provides similar effects as the case of Embodiment 1. However, the follower bearing module of Embodiment 2 differs from the case of Embodiment 1 in the configuration of the shaft portion included in the body portion of the shaft member of the follower bearing and the configuration of the fixing element included in the follower bearing module.

Referring to FIGS. 9, 10, and 11, a shaft portion 31b included in the body portion 17 of the shaft member 12 in the follower bearing module 10b of Embodiment 2 has an axial end provided with notches 34, 35 as the rotation prevention mechanism 38. In the present embodiment, two notches 34 and 35 are placed apart from each other by 180 degrees in the circumferential direction. The notches 34 and 35 are each provided to be recessed in a rectangular shape as viewed in the axial direction and in the radial direction. In other words, the notches 34 and 35 are each provided to be recessed from the second end surface 22 and from the outer circumferential surface 37. The notches 34 and 35 have shapes allowing fitting of protruding portions, which will be described later.

Figure 13:
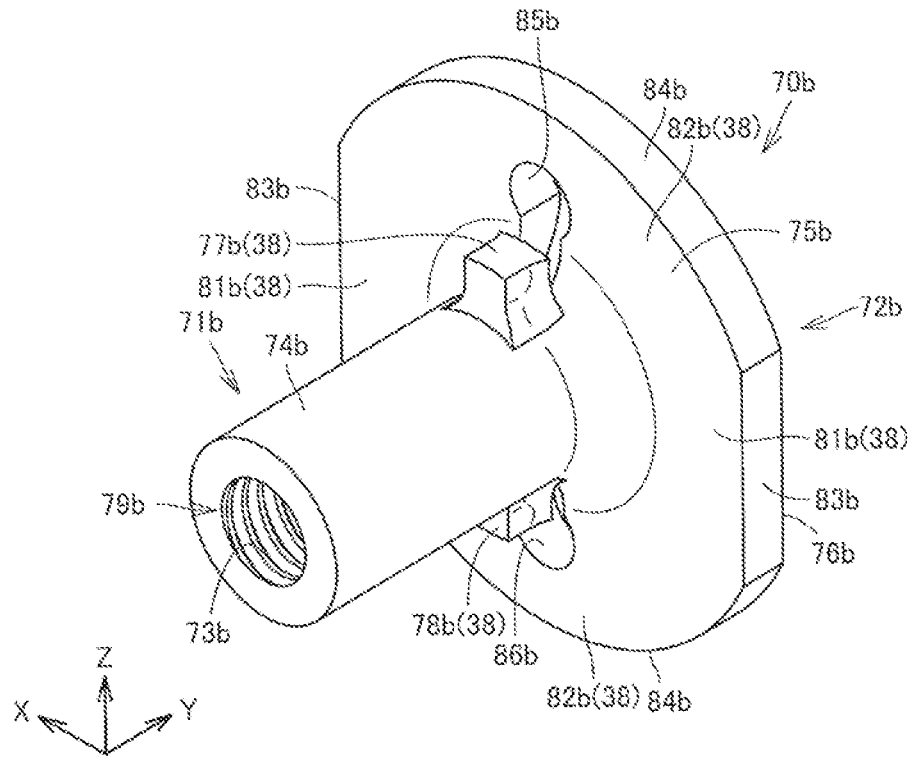
FIG. 13 is a schematic perspective view of a fixing element included in the follower bearing module of Embodiment 2.
Figure 14:
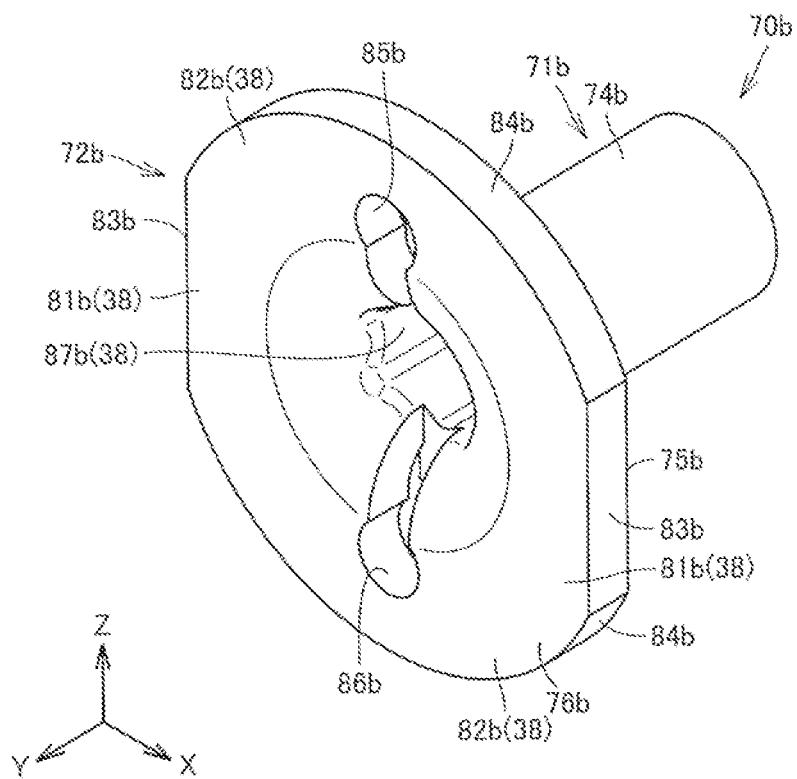
FIG. 14 is a schematic perspective view of the fixing element included in the follower bearing module of Embodiment 2.
Figure 15:
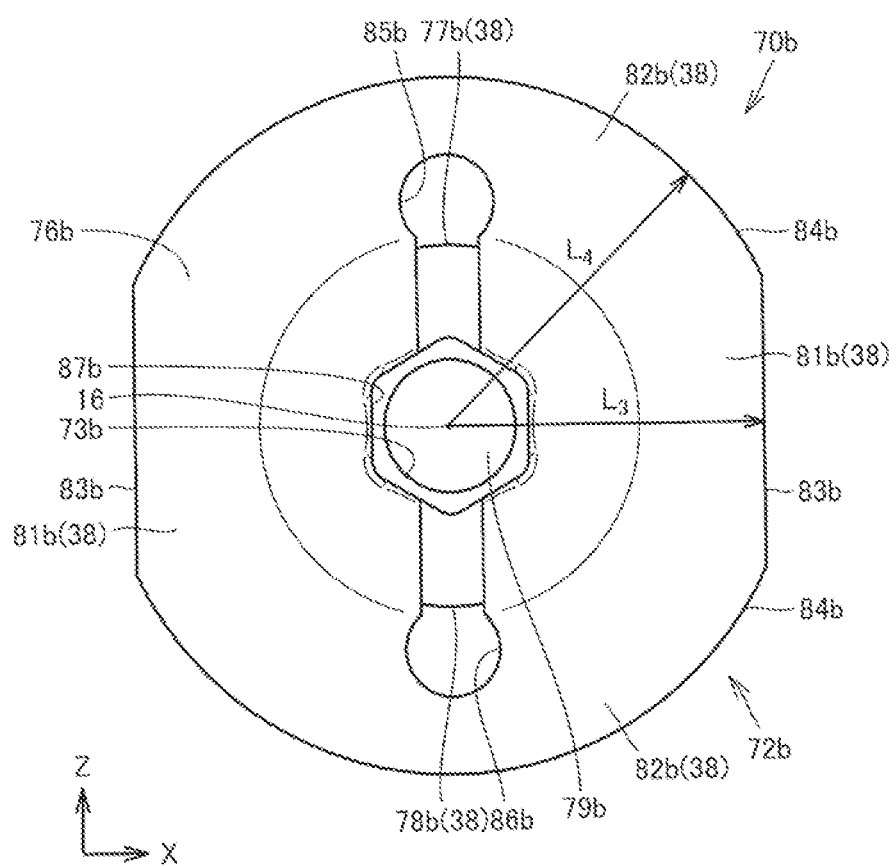
FIG. 15 is a schematic rear view of the fixing element included in the follower bearing module of Embodiment 2.

The configuration of a fixing element 70b included in the follower bearing module 10b of Embodiment 2 is now described. FIGS. 13 and 14 are schematic perspective views of the fixing element 70b included in the follower bearing module 10b of Embodiment 2. FIGS. 13 and 14 are views from different directions. FIG. 15 is a schematic rear view of the fixing element 70b included in the follower bearing module 10b of Embodiment 2. FIG. 15 is a view of the fixing element 70b from a direction opposite to the arrow Y.

Referring to FIGS. 13, 14, and 15 as well, the fixing element 70b includes a cylindrical portion 71b and a plate-shaped portion 72b. The cylindrical portion 71b is disposed in the shaft through hole 24. The cylindrical portion 71b has a through hole 79b formed to penetrate in the axial direction. The cylindrical portion 71b includes an inner circumferential surface 73b and an outer circumferential surface 74b. The outer circumferential surface 74b is a cylindrical surface, except for portions provided with protruding portions 77b and 78b, which will be described later. The cylindrical portion 71b has an outside diameter smaller than the inside diameter of the shaft through hole 24 in the third region 27. It should be noted that the inside diameter of the second region 26 of the shaft through hole 24 of the body portion 17 is smaller than the outside diameter of the cylindrical portion 71b. The cylindrical portion 71b has a threaded groove 80b formed on the inner circumferential surface 73b.

The plate-shaped portion 72b is provided at one end in the axial direction of the cylindrical portion 71b. The plate-shaped portion 72b has a shape extending radially outward. The plate-shaped portion 72b includes a surface (first surface) 75b located on one side in the thickness direction (axial direction), and a surface (second surface) 76b located on the opposite side in the thickness direction. The cylindrical portion 71b has a thickness $T_3$ equal to a thickness $T_4$ of the plate-shaped portion 72b. The thickness $T_3$ of the cylindrical portion 71b is a thickness in the radial direction between the inner circumferential surface 73b and the outer circumferential surface 74b. Specifically, the thickness $T_3$ of the cylindrical portion 71b is a length in the radial direction between the tip end in the radial direction of the threaded groove 80b formed on the inner circumferential surface 73b and the outer circumferential surface 74b. The thickness $T_4$ of the plate-shaped portion 72b is a thickness in the thickness direction (axial direction) between the first surface 75b and the second surface 76b. The thickness $T_4$ of the plate-shaped portion 72b is not less than 1 mm and not more than 5 mm. In the present embodiment, the thickness $T_4$ of the plate-shaped portion 72b is 2 mm. The fixing element 70b with such a configuration can be produced, for example, by press forming because the thickness $T_3$ of the cylindrical portion 71b and the thickness $T_4$ of the plate-shaped portion 72b are equal. Therefore, the fixing element 70b can be produced efficiently, leading to improved productivity. Furthermore, since the thickness $T_4$ of the plate-shaped portion 72b is 1 mm or more and 5 mm or less, it is possible to secure minimum rigidity of the plate-shaped portion 72b to achieve reliable fixation, while reducing the size of the installation space more reliably.

On the outer circumferential surface 74b of the cylindrical portion 71b, protruding portions 77b and 78b as the rotation prevention mechanism 38 are provided. The protruding portions 77b and 78b each have a shape protruding radially outward. A plurality of protruding portions 77b, 78b are provided spaced apart from each other in the circumferential direction. In the present embodiment, two protruding portions are separated from each other by 180 degrees. The protruding portions 776, 78b have a rectangular external shape as viewed in the axial direction. The protruding portions 77b and 78b are each formed by extruding radially outward a part of the portion close to a boundary between the cylindrical portion 71b and the plate-shaped portion 72b. In other words, the protruding portions 77b and 78b are each formed by deforming a portion of the fixing element 70b.

The plate-shaped portion 72b has a circular external shape partially cut off, as viewed in the axial direction (Y direction), which is the thickness direction of the plate-shaped portion 72b. The plate-shaped portion 72b includes a first portion 81b, serving as the rotation prevention mechanism 38, having a first length $L_3$ in the radial direction, and a second portion 82b, serving as the rotation prevention mechanism 38, having a second length $L_4$ longer than the first length in the radial direction (see in particular FIG. 15). Here, the length in the radial direction is the length from the rotational axis 16 to the outer circumferential surface. An outer circumferential surface 83b of the plate-shaped portion 72b corresponding to the first portion 81b is a flat surface. An outer circumferential surface 84b of the plate-shaped portion 72b corresponding to the second portion 82b is a circular arc surface. There are provided a plurality of first portions 81b, two in the present embodiment, and the outer circumferential surfaces 83b of the plate-shaped portion 72b corresponding to the first portions 81b are spaced apart from each other in the circumferential direction and arranged in parallel. The outer circumferential surfaces 83b of the respective first portions 81b and the outer circumferential surfaces 84b of the respective second portions 82b are configured to be connected to each other. In other words, the outer circumferential surface of the plate-shaped portion 72b has a shape obtained by cutting a circular outer circumferential surface as viewed in the axial direction, at two symmetrical locations at equal distances from the rotational axis 16 in the X direction, using a plane including the rotational axis 16 and parallel to the Y-Z plane. On these two first portions 81b, a clamping tool such as an open-end wrench, serving as a tool suppressing the rotation of the fixing element 70b, can be attached in a manner of clamping the plate-shaped portion 72b from the radially outer side.

The plate-shaped portion 72b is provided with two plate-shaped portion through holes 85b and 86b. As viewed in the axial direction, the plate-shaped portion through holes 85b and 86b are provided on the radially outer side of the protruding portions 77b and 78b, respectively. In other words, the plate-shaped portion through holes 85b and 86b are spaced apart from each other by 180 degrees in the circumferential direction. With this, particularly in the case of producing the fixing element 70b by press forming, for example, the protruding portions 77b and 78b can be easily formed by deforming portions of the plate-shaped portion 72b utilizing the plate-shaped portion through holes 85b and 86b. This leads to further improvement in productivity.

The plate-shaped portion 72b also includes a hole portion 87b, serving as the rotation prevention mechanism 38, provided to be recessed from a surface on one side in the thickness direction. That is, the hole portion 87b has a shape recessed in the axial direction. The hole portion 87b has portions with different diameters. The hole portion 87b is configured to be connected to the inner circumferential surface 73b of the cylindrical portion 71b. In the present embodiment, the hole portion 87b is a hexagon socket. A hexagon socket screw key, as the tool suppressing the rotation of the fixing element 70b, can be fitted into this hole portion 87b in the axial direction.

A method of producing such a fixing element 70b is now described in brief. First, a circular plate-shaped member made of a metal is prepared. This plate-shaped member is subjected to progressive pressing to form the cylindrical portion 71b and the plate-shaped portion 72b. Thereafter, the details are machined. Specifically, the plate-shaped portion 72b is partially cut off to form the first portions 81b. Further, following the formation of the plate-shaped portion through holes 85b and 86b, the protruding portions 77b and 78b are formed by extruding the boundary region between the cylindrical portion 71b and the plate-shaped portion 72b. The hole portion 87b is also formed in the plate-shaped portion 72b. The threaded groove 80b is formed on the inner circumferential surface 73b of the cylindrical portion 71b. These details can be machined in any order. Heat treatment is finally conducted, whereby the fixing element 70b with the above configuration is produced.

An example of the mounting process in mounting the follower bearing 11 to the mounted member 90 is now described in brief. First, the shaft portion 31b of the body portion 17 of the follower bearing 11 assembled is advanced in the direction indicated by the arrow Y and inserted into the mounting hole 93 of the mounted member 90. At this time, the inner wall surface 94 of the mounting hole 93 comes to face the outer circumferential surface 37 of the shaft portion 31b in the radial direction. Further, in the axial direction, the second end surface 42 of the side plate 19 comes to contact the first surface 91 of the mounted member 90. It should be noted that a gap is formed between the second end surface 54 of the outer ring 13 and the first surface 91 of the mounted member 90 in the axial direction.

Subsequently, the fixing element 70b is mounted to the mounted member 90 in the axial direction, from the side opposite to the follower bearing 11, i.e., from the second surface 92 side of the mounted member 90. At this time, the fixing element 70b is inserted in the direction opposite to the arrow Y such that the cylindrical portion 71*b* is fitted into the shaft through hole 24. Here, the outer circumferential surface 74*b* of the cylindrical portion 71*b* comes to face the inner circumferential surface of the shaft through hole 24 in the third region 27. Further, the fixing element 70*b* is mounted such that the protruding portions 77*b* and 78*b* of the fixing element 70*b* are fitted into the notches 34 and 35 formed in the shaft portion 31*b*. Here, the fixing element 70*b* can be rotated to some extent in the circumferential direction while pressing the follower bearing 11 in the direction of the arrow Y, to allow the protruding portions 77*b*, 78*b* to be fitted into the notches 34, 35. It should be noted that at this time, the follower bearing 11 may be rotated in the circumferential direction. Thereafter, the bolt 60 as the fastening element is inserted in the direction of the arrow Y, from the first region 25 side into the shaft through hole 24. The bolt 60 is then rotated for tightening.

At this time, the bolt 60 is tightened, while preventing the rotation of the fixing element 70*b* by utilizing the hole portion 87*b*, the first and second portions 81*b* and 82*b*, and the notches 34, 35 and the protruding portions 77*b*, 78*b*, which serve as the rotation prevention mechanism 38, to mount the follower bearing 11 to the mounted member 90. Specifically, in the case where there is an obstacle on the second surface 92 side of the mounted member 90, a hexagon socket screw key is inserted and fitted into the hole portion 87*b* to prevent the rotation of the fixing element 70*b*. If there is no obstacle on the second surface 92 side of the mounted member 90, then a clamping tool such as an open-end wrench is used to clamp and hold the plate-shaped portion 72*b* by utilizing the two first portions 81*b*, to prevent the rotation of the fixing element 70*b*. Furthermore, during tightening of the bolt 60, the protruding portions 77*b*, 78*b* fitted into and caught by the notches 34, 35 prevent the rotation of the fixing element 70*b*, thus preventing the so-called co-rotation of the bolt 60 and the fixing element 70*b*.

According to the follower bearing module 10*b* with the above configuration, the follower bearing 11 and the fixing element 70*b* are fastened together with the bolt 60 in the state where the shaft portion 31*b* is accommodated in the mounting hole 93 and the cylindrical portion 71*b* of the fixing element 70*b* is disposed in the shaft through hole 24 of the shaft portion 31*b*. The plate-shaped portion 72*b* of the fixing element 70*b* has a relatively small wall thickness, and installation of the fixing element 70*b* only requires a space having an axial length of approximately the plate thickness, thus enabling reduction in size of the installation space as compared to the case of fastening using nuts or the like.

Furthermore, the follower bearing module 10*b* with the above configuration includes the rotation prevention mechanism 38, which prevents the rotation of the fixing element 70*b*. Thus, in fastening the follower bearing 11 and the fixing element 70*b* by rotating the bolt 60, the rotation prevention mechanism 38 can be utilized to prevent the rotation of the fixing element 70*b*. Therefore, such a follower bearing module 10*b* makes it possible to reduce the size of the installation space and improve the convenience during mounting of the follower bearing 11.

In the present embodiment, the rotation prevention mechanism 38 includes the notches 34 and 35 provided at an end in the axial direction of the shaft portion 31*b*, and the protruding portions 77*b* and 78*b* provided on the outer circumferential surface 74*b* of the cylindrical portion 71*b* to protrude radially outward and to fit into the notches 34 and 35. Such a rotation prevention mechanism 38 prevents the rotation of the fixing element 70*b* during tightening of the bolt 60 with the protruding portions 77*b* and 78*b* fitted into and caught by the notches 34 and 35, thereby preventing the so-called co-rotation of the bolt 60 and the fixing element 70*b*. The follower bearing 11 can thus be mounted more reliably.

In the present embodiment, a plurality of notches 34, 35 and a plurality of protruding portions 77*b*, 78*b* are provided spaced apart from each other in the circumferential direction of the shaft portion 31*b*. Thus, the rotation of the fixing element 70*b* can be prevented more reliably with the plurality of protruding portions 77*b*, 78*b* fitted into the plurality of notches 34, 35. It should be noted that there may be one notch and one protruding portion, or three or more of each may be provided, as required. It may also be configured such that the number of notches is greater than the number of protruding portions.

In the present embodiment, the rotation prevention mechanism 38 includes the first portion 81*b* and the second portion 82*b* provided in the plate-shaped portion 72*b*, the first portion 81*b* having a first length in the radial direction and the second portion 82*b* having a second length longer than the first length in the radial direction. Such a rotation prevention mechanism 38 makes it possible to prevent rotation of the fixing element 70*b* during tightening of the bolt 60, by allowing a tool suppressing the rotation of the fixing element 70*b*, e.g. a clamping tool such as an open-end wrench, to be attached utilizing the portions of the plate-shaped portion 72*b* with different lengths in the radial direction. In this case, the tool can clamp the fixing element 70*b* from its radially outer side to prevent the fixing element 70*b* from rotating, so the rotation of the fixing element 70*b* can be prevented more efficiently.

In the present embodiment, the outer circumferential surface 83*b* of the plate-shaped portion 72*b* corresponding to the first portion 81*b* includes a flat surface. The outer circumferential surface 84*b* of the plate-shaped portion 72*b* corresponding to the second portion 82*b* includes a circular arc surface. It is thus possible to more reliably prevent the rotation of the fixing element 70*b* by bringing the tool suppressing the rotation of the fixing element 70*b* into close contact with the outer circumferential surface 83*b* of the plate-shaped portion 72*b* corresponding to the first portion 81*b*.

In the present embodiment, the outer circumferential surface 83*b* of the plate-shaped portion 72*b* corresponding to the first portion 81*b* includes a plurality of flat surfaces spaced apart from each other in the circumferential direction and arranged in parallel. This makes it possible to utilize the plurality of flat surfaces to more reliably prevent the rotation of the fixing element 70*b*.

In the present embodiment, the rotation prevention mechanism 38 includes the hole portion 87*b* provided in the plate-shaped portion 72*b* to be recessed from a surface on one side in its thickness direction, the hole portion 87*b* having portions with different diameters. Such a rotation prevention mechanism 38 can suppress the rotation of the fixing element 70*b* during tightening of the bolt 60, with a tool suppressing the rotation of the fixing element 70*b* being fitted into the hole portion 87*b*. In this case, even if a member interfering with the tool is placed on the radially outer side of the plate-shaped portion 72*b*, the tool can be fitted into the hole portion 87*b* in the axial direction. It is thus possible to prevent the rotation of the fixing element 70*b* more efficiently.

The hole portion 87*b* includes the hexagon socket. Thus, during tightening of the bolt 60, the rotation of the fixing element 70*b* can be suppressed by using a hexagon socket screw key and fitting it into the hole portion 87b, thereby more reliably preventing the rotation of the fixing element 70b.

In the present embodiment, the rotation prevention mechanism 38 includes: the notches 34 and 35, provided at an end in the axial direction of the shaft portion 31b; the protruding portions 77b and 78b, provided on the outer circumferential surface 74b of the cylindrical portion 71b to protrude radially outward and to fit into the notches 34 and 35; the first portion 81b and the second portion 82b provided in the plate-shaped portion 72b, the first portion 81b having the first length in the radial direction and the second portion 82b having the second length longer than the first length in the radial direction; and the hole portion 87b provided in the plate-shaped portion 72b to be recessed from a surface on one side in its thickness direction, the hole portion 87b having portions with different diameters. Therefore, during tightening of the bolt 60, the protruding portions 77b and 78b fitted into and caught by the notches 34 and 35 prevent the rotation of the fixing element 70b, thereby preventing the so-called co-rotation of the bolt 60 and the fixing element 70b In addition, at least one of the first and second portions 81b, 82b and the hole portion 87b can be utilized to attach a tool suppressing the rotation of the fixing element 70b, according to the installation conditions of the follower bearing 11, to thereby prevent the rotation of the fixing element 70b during tightening of the bolt 60. As such, the mounting can be done utilizing any one or more of the rotation prevention mechanism 38 according to the circumstances, leading to further improvement in convenience.

The above-described fixing element 70b (follower bearing fixing element) includes: the cylindrical portion 71b disposed in the shaft through hole 24 and having the threaded groove 80b on its inner circumferential surface 73b; the plate-shaped portion 72b provided at one end in the axial direction of the cylindrical portion 71b and extending radially outward; the protruding portions 77b and 78b provided on the outer circumferential surface 74b of the cylindrical portion 71b and protruding radially outward; the first and second portions 81b and 82b provided in the plate-shaped portion 72b, the first portion 81b having a first length in the radial direction and the second portion 82b having a second length longer than the first length in the radial direction; and the hole portion 87b provided in the plate-shaped portion 72b to be recessed from a surface on one side in its axial direction, the hole portion 87b having portions with different diameters.

According to such a follower bearing fixing element 70b, the plate-shaped portion 72b of the fixing element 70b has a relatively small wall thickness, and installation of the fixing element 70b only requires a space having an axial length of approximately the plate thickness, thus enabling reduction in size of the installation space as compared to the case of fastening using nuts or the like. Further, during mounting of the follower bearing 11, the protruding portions 77b, 78b can be utilized to prevent the so-called co-rotation of the bolt 60 and the fixing element 70b. In addition, a tool suppressing the rotation of the fixing element 70b can be attached utilizing at least one of the first and second portions 81b, 82b and the hole portion 87b, according to the installation conditions of the follower bearing 11, to prevent the rotation of the fixing element 70b during tightening of the bolt 60. Therefore, the mounting can be done utilizing any one or more of the rotation prevention mechanism 38 according to the circumstances, leading to further improvement in convenience. From the above, such a follower bearing fixing element 70b makes it possible to reduce the size of the installation space and improve the convenience during mounting of the follower bearing 11.

Other Embodiment

Although the rollers have been used as the rolling elements in the above embodiments, not limited thereto, balls can be used as the rolling elements. This can reduce the size of the follower bearing and, thus, the size of the follower bearing module.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10a, 10b: follower bearing module; 11: follower bearing; 12: shaft member; 13: outer ring; 14: roller; 15: cage; 16: rotational axis; 17: body portion; 18: flange portion; 19: side plate; 21, 41, 53: first end surface; 22, 42, 54: second end surface; 23, 37, 43, 48, 52, 63, 73a, 74a, 83a, 84a: outer circumferential surface; 24: shaft through hole; 25: first region; 26: second region; 27: third region; 28, 29, 36: stepped surface; 31a, 31b: shaft portion; 32: large diameter portion; 33: first raceway surface; 34, 35: notch; 38: rotation prevention mechanism; 44, 73: inner circumferential surface; 47: pocket; 49: end surface; 51: second raceway surface; 55: central portion; 56, 57: end; 60: bolt; 61: body; 62: head; 64: recess; 70a, 70b: fixing element; 71a, 71b: cylindrical portion; 72a, 72b: plate-shaped portion; 75a, 75b: surface (first surface); 76a, 76b: surface (second surface); 77a, 80b: threaded groove; 77b, 78b: protruding portion; 78a: circular arc surface; 79a, 79b: through hole; 81a, 81b: first portion; 82a, 82b: second portion; 85a, 87b: hole portion; 85b, 86b: plate-shaped portion through hole; 90: mounted member; 91: first surface; 92: second surface; 93: mounting hole; and 94: inner wall surface.

The invention claimed is:

1. A follower bearing module for mounting a follower bearing to a mounted member having a mounting hole, the follower bearing module comprising:
  a follower bearing;
  a fixing element operative to fix the follower bearing to the mounted member; and
  a fastening element operative to fasten the follower bearing and the fixing element, the fastening element including a body having threads on an outer circumferential surface thereof;
  the follower bearing including
    an inner member having a shaft through hole penetrating in an axial direction, the inner member having an annular first raceway surface on an outer circumferential surface thereof,
    an outer ring having an annular second raceway surface facing the first raceway surface on an inner circumferential surface thereof, and
    a plurality of rolling elements arranged on an annular raceway along the first and second raceway surfaces so as to contact the first and second raceway surfaces,
  the inner member including a large diameter portion having the first raceway surface provided thereon, and a shaft portion extending in the axial direction from the large diameter portion and having at least a portion accommodated in the mounting hole, the fixing element including a cylindrical portion disposed in the shaft through hole and having a threaded groove on an inner circumferential surface thereof, and a plate-shaped portion provided at one end in the axial direction of the cylindrical portion and extending radially outward, the fastening element fastening the follower bearing and the fixing element with the cylindrical portion being disposed in the shaft through hole, at least one of the follower bearing and the fixing element including a rotation prevention mechanism operative to prevent rotation of the fixing element.

2. The follower bearing module according to claim 1, wherein the cylindrical portion and the plate-shaped portion differ in thickness.

3. The follower bearing module according to claim 2, wherein the plate-shaped portion is greater in thickness than the cylindrical portion.

4. The follower bearing module according to claim 1, wherein in a cross section of the fixing element cut in a plane including a center of the shaft through hole, a circular arc surface is formed in a region where a surface of the plate-shaped portion and an outer circumferential surface of the cylindrical portion are connected.

5. The follower bearing module according to claim 4, wherein the circular arc surface has a radius of not less than 0.5 mm and not more than 1.5 mm.

6. The follower bearing module according to claim 1, wherein the rotation prevention mechanism includes a first portion and a second portion provided in the plate-shaped portion, the first portion having a first length in a radial direction, the second portion having a second length longer than the first length in the radial direction.

7. The follower bearing module according to claim 6, wherein a portion of an outer circumferential surface of the plate-shaped portion corresponding to the first portion includes a flat surface, and a portion of the outer circumferential surface of the plate-shaped portion corresponding to the second portion includes a circular arc surface.

8. The follower bearing module according to claim 7, wherein the portion of the outer circumferential surface of the plate-shaped portion corresponding to the first portion includes a plurality of flat surfaces spaced apart from each other in a circumferential direction and arranged in parallel.

9. The follower bearing module according to claim 1, wherein the rotation prevention mechanism includes a hole portion provided in the plate-shaped portion to be recessed from a surface on one side in a thickness direction thereof, the hole portion having portions with different diameters.

10. The follower bearing module according to claim 9, wherein the hole portion includes a hexagon socket.

11. The follower bearing module according to claim 9, wherein the plate-shaped portion is in a flat plate shape, and the hole portion is formed to extend, in the axial direction of the cylindrical portion, from the threaded groove to the surface on the one side of the plate-shaped portion.

12. The follower bearing module according to claim 1, wherein the plate-shaped portion has a thickness of not less than 1 mm and not more than 5 mm.

* * * * *